(12) United States Patent
Rabin et al.

(10) Patent No.: US 9,795,882 B1
(45) Date of Patent: Oct. 24, 2017

(54) INTERACTIVE SYSTEM AND METHOD

(71) Applicants: Gregory S. Rabin, New York, NY (US); Steven M. Hoffberg, West Harrison, NY (US)

(72) Inventors: Gregory S. Rabin, New York, NY (US); Steven M. Hoffberg, West Harrison, NY (US)

(*) Notice: Subject to any disclaimer, the term of this patent is extended or adjusted under 35 U.S.C. 154(b) by 60 days.

(21) Appl. No.: 14/851,860

(22) Filed: Sep. 11, 2015

Related U.S. Application Data

(63) Continuation of application No. 13/161,820, filed on Jun. 16, 2011, now Pat. No. 9,132,352.

(60) Provisional application No. 61/358,232, filed on Jun. 24, 2010.

(51) Int. Cl.

| | |
|---|---|
| *G06T 9/00* | (2006.01) |
| *G06F 3/01* | (2006.01) |
| *A63F 13/65* | (2014.01) |
| *G06T 13/40* | (2011.01) |
| *G06T 15/40* | (2011.01) |
| *G06T 15/04* | (2011.01) |
| *G06T 7/20* | (2017.01) |

(52) U.S. Cl.
CPC ............... *A63F 13/65* (2014.09); *G06T 7/20* (2013.01); *G06T 13/40* (2013.01); *G06T 15/04* (2013.01); *G06T 15/40* (2013.01); *G06T 2200/04* (2013.01); *G06T 2200/08* (2013.01); *G06T 2207/30221* (2013.01); *G06T 2215/16* (2013.01)

(58) Field of Classification Search
None
See application file for complete search history.

(56) References Cited

U.S. PATENT DOCUMENTS

| | | |
|---|---|---|
| 5,247,587 A | 9/1993 | Hasegawa et al. |
| 5,342,047 A | 8/1994 | Heidel et al. |
| 5,416,848 A | 5/1995 | Young |
| 5,557,724 A | 9/1996 | Sampat et al. |
| 5,781,146 A | 7/1998 | Frederick |

(Continued)

OTHER PUBLICATIONS

Hao Jiang et al, Video segmentation with the assistance of audio content analysis, Beijing, China 2000.

(Continued)

*Primary Examiner* — Barry Drennan
*Assistant Examiner* — Jason Pringle-Parker
(74) *Attorney, Agent, or Firm* — Steven M. Hoffberg; Ostrolenk Faber LLP

(57) ABSTRACT

A system and method for receiving an ordered set of images and analyzing the images to determine at least one position in space and at least one motion vector in space and time for at least one object represented in the images is disclosed. Using these vectors, a four dimensional model of at least a portion of the information represented in the images is formulated. This model generally obeys the laws of physics, though aberrations may be imposed. The model is then exercised with an input parameter, which, for example, may represent a different perspective than the original set of images. The four dimensional model is then used to produce a modified set of ordered images in dependence on the input parameter and optionally the set of images, e.g., if only a portion of the data represented in the images is modeled. The set of images may then be rendered on a display device.

19 Claims, 15 Drawing Sheets

(56) References Cited

U.S. PATENT DOCUMENTS

| | | | |
|---|---|---|---|
| 5,850,352 A * | 12/1998 | Moezzi et al. | H04N 5/222 |
| | | | 345/419 |
| 5,852,450 A | 12/1998 | Thingvold | |
| 5,875,108 A | 2/1999 | Hoffberg et al. | |
| 5,901,246 A | 5/1999 | Hoffberg et al. | |
| 5,930,379 A | 7/1999 | Rehg et al. | |
| 5,988,862 A | 11/1999 | Kacyra et al. | |
| 6,072,504 A * | 6/2000 | Segen | G06T 7/2033 |
| | | | 345/474 |
| 6,080,063 A | 6/2000 | Khosla | |
| 6,081,750 A | 6/2000 | Hoffberg et al. | |
| 6,084,590 A * | 7/2000 | Robotham | G06T 13/00 |
| | | | 345/419 |
| 6,118,887 A | 9/2000 | Cosatto et al. | |
| 6,124,862 A * | 9/2000 | Boyken | G06T 7/20 |
| | | | 345/419 |
| 6,133,946 A * | 10/2000 | Cavallaro | G01B 11/002 |
| | | | 348/135 |
| 6,144,375 A | 11/2000 | Jain et al. | |
| 6,215,516 B1 | 4/2001 | Ma et al. | |
| 6,233,389 B1 | 5/2001 | Barton et al. | |
| 6,400,996 B1 | 6/2002 | Hoffberg et al. | |
| 6,429,903 B1 | 8/2002 | Young | |
| 6,441,846 B1 | 8/2002 | Carlbom et al. | |
| 6,496,598 B1 | 12/2002 | Harman | |
| 6,616,529 B1 | 9/2003 | Qian et al. | |
| 6,654,018 B1 | 11/2003 | Cosatto et al. | |
| 6,671,390 B1 | 12/2003 | Barbour et al. | |
| 6,711,278 B1 | 3/2004 | Gu et al. | |
| 6,726,567 B1 | 4/2004 | Khosla | |
| 6,738,065 B1 | 5/2004 | Even-Zohar | |
| 6,754,373 B1 | 6/2004 | de Cuetos et al. | |
| 7,133,040 B1 | 11/2006 | Abdallah et al. | |
| 7,228,279 B2 | 6/2007 | Chaudhari et al. | |
| 7,251,603 B2 | 7/2007 | Connell et al. | |
| 7,319,955 B2 | 1/2008 | Deligne et al. | |
| 7,403,202 B1 * | 7/2008 | Nash | G06T 7/2033 |
| | | | 345/474 |
| 7,415,152 B2 | 8/2008 | Jiang et al. | |
| 7,457,439 B1 | 11/2008 | Madsen et al. | |
| 7,480,617 B2 | 1/2009 | Chu et al. | |
| 7,542,034 B2 * | 6/2009 | Spooner et al. | G06T 15/20 |
| | | | 345/419 |
| 7,620,250 B2 | 11/2009 | Adamek et al. | |
| 7,675,520 B2 | 3/2010 | Gee et al. | |
| 7,702,660 B2 | 4/2010 | Chan et al. | |
| 7,796,155 B1 | 9/2010 | Neely, III et al. | |
| 7,844,462 B2 | 11/2010 | Mayer-Ullmann | |
| 8,179,393 B2 | 5/2012 | Minear et al. | |
| 8,185,448 B1 * | 5/2012 | Myslinski | G06Q 10/10 |
| | | | 705/26.1 |
| 8,284,238 B2 | 10/2012 | Stone et al. | |
| 8,411,931 B2 | 4/2013 | Zhou et al. | |
| 8,554,526 B2 * | 10/2013 | Andersen | A63F 13/10 |
| | | | 345/420 |
| 8,758,103 B2 | 6/2014 | Nicora et al. | |
| 9,132,352 B1 | 9/2015 | Rabin et al. | |
| 2001/0003715 A1 * | 6/2001 | Jutzi | A63F 13/12 |
| | | | 463/40 |
| 2001/0052899 A1 | 12/2001 | Simpson et al. | |
| 2003/0219146 A1 | 11/2003 | Jepson et al. | |
| 2004/0179008 A1 | 9/2004 | Gordon et al. | |
| 2005/0130725 A1 * | 6/2005 | Creamer | A63F 13/10 |
| | | | 463/1 |
| 2005/0222844 A1 | 10/2005 | Kawahara et al. | |
| 2005/0261073 A1 | 11/2005 | Farrington et al. | |
| 2006/0061583 A1 | 3/2006 | Spooner et al. | |
| 2006/0139355 A1 | 6/2006 | Tak et al. | |
| 2006/0204079 A1 | 9/2006 | Yamaguchi | |
| 2006/0251339 A1 | 11/2006 | Gokturk et al. | |
| 2006/0253491 A1 | 11/2006 | Gokturk et al. | |
| 2007/0080967 A1 | 4/2007 | Miller | |
| 2007/0092143 A1 | 4/2007 | Higgins | |
| 2007/0146372 A1 * | 6/2007 | Gee | G06T 13/00 |
| | | | 345/474 |
| 2007/0157226 A1 | 7/2007 | Misra | |
| 2007/0168427 A1 | 7/2007 | Thelen et al. | |
| 2007/0236515 A1 * | 10/2007 | Montague | G06F 3/04845 |
| | | | 345/649 |
| 2007/0260627 A1 | 11/2007 | Knittel et al. | |
| 2008/0018667 A1 * | 1/2008 | Cheng | A63F 13/10 |
| | | | 345/632 |
| 2008/0027931 A1 | 1/2008 | Lu et al. | |
| 2008/0036732 A1 * | 2/2008 | Wilson et al. | G06F 3/017 |
| | | | 345/156 |
| 2008/0146302 A1 | 6/2008 | Olsen et al. | |
| 2008/0186330 A1 | 8/2008 | Pendleton et al. | |
| 2008/0312010 A1 | 12/2008 | Marty et al. | |
| 2009/0002364 A1 | 1/2009 | Witte | |
| 2009/0029754 A1 | 1/2009 | Slocum et al. | |
| 2009/0059007 A1 | 3/2009 | Wagg et al. | |
| 2009/0096879 A1 | 4/2009 | Motomura et al. | |
| 2009/0128548 A1 | 5/2009 | Gloudemans et al. | |
| 2009/0128549 A1 | 5/2009 | Gloudemans et al. | |
| 2009/0128563 A1 | 5/2009 | Gloudemans et al. | |
| 2009/0128568 A1 | 5/2009 | Gloudemans et al. | |
| 2009/0128577 A1 | 5/2009 | Gloudemans et al. | |
| 2009/0129630 A1 * | 5/2009 | Gloudemans et al. | G06T 15/20 |
| | | | 382/103 |
| 2009/0143124 A1 * | 6/2009 | Hughes | A63F 13/10 |
| | | | 463/2 |
| 2009/0150802 A1 | 6/2009 | Do et al. | |
| 2009/0244404 A1 | 10/2009 | Park | |
| 2009/0278986 A1 | 11/2009 | Ikegami | |
| 2009/0315839 A1 | 12/2009 | Wilson et al. | |
| 2009/0322860 A1 | 12/2009 | Zhang et al. | |
| 2009/0327894 A1 | 12/2009 | Rakib et al. | |
| 2010/0066701 A1 | 3/2010 | Ningrat | |
| 2010/0103173 A1 | 4/2010 | Lee et al. | |
| 2011/0022589 A1 | 1/2011 | Bauer et al. | |
| 2011/0194734 A1 | 8/2011 | Gensolen et al. | |
| 2012/0182391 A1 | 7/2012 | Gallagher et al. | |

OTHER PUBLICATIONS

Timothy J. Hazen, Visual model structures and synchrony constraints for audio-visual speech recognition, 2006.

Michael A. Smith et al, Video skimming for quick browsing based on audio and image characterization, Pittsburgh, PA, Jul. 30, 1995.

Dongge Li et al, Classification of general audio data for content-based retrieval, Detroit, MI 2001.

M. Baillie et al, Audio-based event detection for sports video, 2003.

Kunio Kashino, A quick search method for audio and video signals based on histogram pruning, IEEE Transactions on Multimedia, vol. 5, No. 3, Sep. 2003.

Liwei He et al, Auto-summarization of audio-video presentations, Redmond, WA 1999.

Ramesh Jain et al, Metadata in video databases, La Jolla, CA 1994.

John W. Fisher et al, Learning joint statistical models for audio-visual fusion and segregation, Cambridge, MA 2001.

Stefan Eickeler et al, Content-based video indexing of TV broadcast news using hidden Markov models, Duisburg, Germany 1999.

M. J. Tomlinson et al, Integrating audio and visual information to provide highly robust speech recognition, United Kingdom 1996.

Arun Hampapur et al, Production model based digital video segmentation, Multimedia Tools and Applications, 1, 9-46, 1995.

Maia Garau et al, The impact of eye gaze on communication using humanoid avatars, United Kingdom, 2001.

Nobuhiko Kitawaki et al, Multimedia opinion model based on media interaction of audio-visual communications, Japan, 2005.

Glorianna Davenport et al, Cinematic primitives for multimedia, 1991.

Martin Cooke et al, An audio-visual corpus for speech perception and automatic speech recognition, Acoustical Society of America, 2006.

Herve Glotin et al, Weighting schemes for audio-visual fusion in speech recognition, Martigny, Switzerland 201.

(56) References Cited

OTHER PUBLICATIONS

T.D.C. Little et al, A digital on-demand video service supporting content-based queries, Boston, MA 1993.
Andrew Singer et al, Tangible progress: less is more in Somewire audio spaces, Palo Alto, CA 1999.
Howard Wactlar et al, Complementary video and audio analysis for broadcast news archives, 2000.
Wei Qi et al, Integrating visual, audio and text analysis for news video, Beijing, China 2000.
Lie Lu et al, A robust audio classification and segmentation method, China 2001.
Mark Barnard et al, Multi-modal audio-visual event recognition for football analysis, Switzerland 2003.
Aljoscha Smolic, 3d video and free viewpoint video-technologies, applications and mpeg standards, 2006.
Guillaume Gravier et al, Maximum entropy and MCE based HMM stream weight estimation for audio-visual ASR, Yorktown Heights, NY 2002.
Jonathan Foote et al, Finding presentations in recorded meetings using audio and video features, Palto Alto, CA, 1999.
Sofia Tsekeridou et al, Content-based video parsing and indexing based on audio-visual interaction, Thessaloniki, Greece, 2001.
Zhang et al, Hierarchical classification of audio data for archiving and retrieving, Los Angeles, CA 1999.
John N. Gowdy et al, DBN based multi-stream models for audio-visual speech recognition, Clemson, SC 2004.
Ross Cutler et al, Look who's talking: Speaker detection using video and audio correlation, Maryland, 2000.
Chalapathy V. Neti et al, Audio-visual speaker recognition for video broadcast news, Yorktown Heights, NY 1999.
G. Iyengar et al, Audio-visual synchrony for detection of monologues in video archives, Yorktown Heights, NY 2003.
Trevor Darrell et al, Audio-visual Segmentation and "The Cocktail Party Effect", Cambridge, MA, 2000.
Girija Chetty et al, Liveness verification in audio-video speaker authentication, Sydney, Australia, 2004.
Hayley Hung et al, Using audio and video features to classify the most dominant person in a group meeting, Germany, 2007.
E. Kijak et al, HMM based structuring of tennis videos using visual and audio cues, France, 2003.
Marco Cristani et al, Audio-visual event recognition in surveillance video sequences, Italy, 2006.
Stephane Dupont et al, Audio-visual speech modeling for continuous speech recognition, IEEE Transactions on Multimedia, vol. 2, No. 3, Sep. 2000.
Benoit Maison et al, Audio-visual speaker recognition for video broadcast news: some fusion techniques, Yorktown Heights, NY 1999.
Shih-Fu Chang et al, Overview of the MPEG-7 standard, IEEE Transactions on Circuits and Systems for Video Technology, vol. 11, No. 6, Jun. 2001.
Luhong Liang et al, Speaker independent audio-visual continuous speech recognition, Santa Clara, CA 2002.
Min Xu et al, Affective content analysis in comedy and horror videos by audio emotional event detection, Singapore, 2005.
Ming-Chieh Lee et al, A layered video object coding system using sprite and affine motion model, IEEE Transactions on Circuits and Systems for Video Technology, vol. 7, No. 1, Feb. 1997.
Ajay Divakaran et al, Video summarization using mpeg-7 motion activity and audio descriptors, Cambridge, MA, May 2003.
Mingli Song et al, Audio-visual based emotion recognition—a new approach, China, 2004.
Hyoung-Gook Kim et al, Audio classification based on MPEG-7 spectral basis representations, IEEE Transactions on Circuits and Systems for Video Technology, vol. 14, No. 5, May 2004.
Tianming Liu et al, A novel video key-frame-extraction algorithm based on perceived motion energy model, IEEE Transactions on Circuits and Systems for Video Technology, vol. 13, No. 10, Oct. 2003.
Ling-Yu Duan et al, A mid-level representation framework for semantic sports video analysis, Singapore, 2003.
Shih-Fu Chang, The holy grail of content-based media analysis, 2002.
S. Shyam Sundar, Multimedia effects on processing and perception of online news: A study of picture, audio, and video downloads, Journalism and Mass Communication Quarterly, Autumn 2007.
John S. Boreczky et al, A hidden Markov model framework for video segmentation using audio and image features, 1998, Palto Alto, CA.
Gerasimos Potamianos et al, An Image Transform Approach for HMM Based Automatic Lipreading, 1998, vol. III, pp. 173-177, Chicago.
Gerasimos Potamianos et al, Recent Advances in the Automatic Recognition of Audio-Visual Speech, Proceedings of the IEEE, vol. 91, No. 9, Sep. 2003.
Michael Isard et al, Condensation—Conditional Density Propagation for Visual Tracking, Int. J. Computer Vision, 1998.
Carlo Tomasi, Shape and Motion from Image Streams under Orthography: a Factorization Method, International Journal of Computer Vision, 9:2, 137-154, 1992.
Brian Babcock et al, Models and Issues in Data Stream Systems, Department of Computer Science, Stanford, CA, 2002.
Simon Lucey et al, Integration Strategies for Audio-Visual Speech Processing: Applied to Text Dependent Speaker Recognition, Pittsburgh, PA, 2005.
Yu-Fei Ma et al, A User Attention Model for Video Summarization, Beijing, China 2002.
Brian Clarkson et al, Unsupervised Clustering of Ambulatory Audio and Video, Cambridge, MA, 1999.
Christoph Bregler, et al, Video rewrite: Driving visual speech with audio, 1997.
Thomas Sikora, The MPEG-4 video standard verification model, IEEE Transactions on Circuits and Systems for Video Technology, vol. 7, No. 1, Feb. 1997.
Zhu Liu et al, Classification TV programs based on audio information using hidden Markov model, Brooklyn, NY 1998.
George W. Uetz et al, Multisensory cues and multimodal communication in spiders: insights from video/audio playback studies, Brain Behav Evol, 59:222-230, 2002.
Robert W. Frischholz et al, BioID: A multimodal biometric identification system, Feb. 2000.
Samy Bengio, An asynchronous hidden markov model for audio-visual speech recognition, Switzerland, 2003.
Nael Hirzalla et al, A temporal model for interactive multimedia scenarios, IEEE Multimedia, vol. 2, No. 3, pp. 24-31, Fall 1995.
Matthew J. Beal et al, Audio-video sensor fusion with probabilistic graphical models, Redmond, WA, 2002.
Tanzeem Choudhury et al, Multimodal person recognition using unconstrained audio and video, Cambridge, MA, 1999.
Yu-Fei Ma et al, A generic framework of user attention model and its application in video summarization, Beijing, China, 2005.
Min Xu et al, Creating audio keywords for event detection in soccer video, Singapore, 2003.
Ricardo Machado Leite De Barros et al, A Method to Synchronise Video Cameras Using the Audio Band, Brazil, Dec. 2004.
Sumedh Mungee et al, The design and performance of a CORBA audio/video streaming service, St. Louis, MO 1999.
P. Venkat Rangan et al, Designing file systems for digital video and audio, San Diego, Ca 1991.
Malcolm Slaney et al, Facesync: A linear operator for measuring synchronization of video facial images and audio tracks, San Jose, CA 2001.
Isao Hara et al, Robust speech interface based on audio and video information fusion for humanoid HRP-2, IEEE International Conference on Intelligent Robots and Systems, Sandai, Japan, Sep. 28-Oct. 2, 2004.
Robin Mason, Models of Online Courses, ALN Magazine, United Kingdom, 1998.
Isao Otsuka et al, A highlight scene detection and video summarization system using audio feature for a personal video recorder, Cambridge, MA, 2005.

(56) References Cited

OTHER PUBLICATIONS

W. H. Adams et al, Semantic indexing of multimedia content using visual, audio, and text cues, EURASIP Journal on Applied Signal Processing, pp. 170-185, 2003.
Ara V. Nefian et al, A coupled HMM for audio-visual speech recognition, Santa Clara, CA 2002.
Juergen Luettin, Asynchronous stream modeling for large vocabulary audio-visual speech recognition, Switzerland, 2001.
Klaus Havelund et al, Formal modeling and analysis of an audio/video protocol: an industrial case study using UPPAAL, Nov. 1997.
Victor Kulesh et al, Video clip recognition using joint audio-visual processing model, Rochester, MI 2002.
Valerie Gay et al, Specification of multiparty audio and video interaction based on the Reference Model of Open Distributed Processing, Computer Networks and ISDN Systems 27, pp. 1247-1262, 1995.
Shi-Fu Chang et al, Combining text and audio-visual features in video indexing, Massachusetts, 2005.
J. Heere et al, The reference model architecture for MPEG spatial audio coding, Barcelona, Spain, 2005.
Alexander G. Hauptmann et al, Text, Speech, and Vision for Video Segmentation: The Informedia TM Project, Pittsburgh, PA 1995.
Ara V. Nefian et al, Dynamic Bayesian networks for audio-visual speech recognition, EURASIP Journal on Applied Signal Processing 2002:11, pp. 1274-1288, 2002.
Rui Cai et al, Highlight sound effects detection in audio stream, Beijing, China 2003.
Xiaoxing Liu et al, Audio-visual continuous speech recognition using a coupled hidden Markov model, 2002.
Peter K. Doenges et al, MPEG-4: Audio/video and synthetic graphics/audio for mixed media, Salt Lake City, Utah 1997.
Dov Te'Eni, Review: A cognitive-affective model of organizational communication for designing IT, MIS Quarterly vol. 25, No. 2, pp. 251-312, Jun. 2001.
D. A. Sadlier et al, Event detection in field sports video using audio-visual features and a support vector machine, IEEE Transaction on Circuits and Systems for Video Technology, vol. 15, No. 10, Oct. 2005.
Zhihai He, A linear source model and a unified rate control algorithm for DCT video coding, IEEE Transactions on Circuits and Systems for Video Technology, vol. 12, No. 11, Nov. 2002.
Iain Matthews et al, A comparison of model and transform-based visual features for audio-visual LVCSR, Pittsburgh, PA 2001.
W. Zajdel et al, Cassandra: audio-video sensor fusion for aggression detection, 2007.
B. Ugur Toreyin et al, HMM based falling person detection using both audio and video, Ankara, Turkey 2005.
M. R. Naphade et al, Probabilistic multimedia objects (multijects): A novel approach to video indexing and retrieval in multimedia systems, Chicago, Illinois 1998.
Hao Jiang et al, Video segmentation with the support of audio segmentation and classification, Beijing, China 2000.
Yao Wang et al, Multimedia content analysis-using both audio and visual clues, IEEE Signal Processing Magazine, Nov. 2000.
Chen-Nee Chuah et al, Characterizing packet audio streams from internet multimedia applications, Davis, CA 2002.
G. Iyengar et al, Semantic indexing of multimedia using audio, text and visual cues, Yorktown Heights, NY 2002.
M. Baillie et al, An audio-based sports video segmentation and event detection algorithm, United Kingdom, 2004.
Michael G. Christel et al, Evolving video skims into useful multimedia abstractions, 1998.
Jonathan Foote, An overview of audio information retrieval, Multimedia Systems 7:2-10, 1999.
Erling Wold et al, Content-based classification, search, and retrieval of audio, 1996.
Munish Gandhi et al, A data model for audio-video data, Oct. 1994.
Regunathan Radhakrishnan et al, Generation of sports highlights using a combination of supervised & unsupervised learning in audio domain, Japan, 2003.
Hari Sundaram et al, A utility framework for the automatic generation of audio-visual skims, New York, NY 2002.
Tong Zhang et al, Heuristic approach for generic audio data segmentation and annotation, Los Angeles, CA, 1999.
Hari Sundaram et al, Determining computable scenes in films and their structures using audio-visual memory models, New York, NY 2000.
Min Xu et al, Audio keyword generation for sports video analysis, Singapore, 2004.
U. Iurgel et al, New approaches to audio-visual segmentation of TV news for automatic topic retrieval, Duisburg, Germany, 2001.
Mingli Song et al, Audio-visual based emotion recognition using tripled hidden Markov model, China, 2004.
Van-Thinh Vu et al, Audio-video event recognition system for public transport security, France, 2006.
A. Ghias et al, Query by humming: musical information retrieval in an audio database, Feb. 9, 2005.
Juergen Luettin et al, Continuous audio-visual speech recognition, Belgium, 1998.
Nevenka Dimitrova et al, Motion recovery for video content classification, Arizona, 1995.
Nuria Oliver et al, Layered representations for human activity recognition, Redmond, WA 2002.
Michael A. Smith et al, Video skimming and characterization through the combination of image and language understanding, Pittsburgh, PA 1998.
Matthew Roach et al, Classification of video genre using audio, United Kingdom, 2001.
Hideki Asoh et al, An application of a particle filter to bayesian multiple sound source tracking with audio and video information fusion, Japan, 2004.
C. Neti et al, Perceptual interfaces for information interaction: Joint processing of audio and visual information for human-computer interaction, Yorktown Heights, NY 2000.
Chalapathy Neti et al, Large-vocabulary audio-visual speech recognition: A summary of the Johns Hopkins Summer 2000 Workshop, Pittsburgh, PA 2001.
Shih-Fu Chang et al, VideoQ: an automated content based video search system using visual cues, Seattle, WA, 1997.
Shin Ichi Satoh et al, Name-It: Naming and Detecting Faces in Video the Integration of Image and Natural Language Processing, Pittsburgh, PA 1997.
Silvia Pfeiffer et al, Automatic audio content analysis, Mannheim, Germany 1997.
Tong Zhang et al, Hierarchical system for content-based audio classification and retrieval, Los Angeles, CA 1998.
Jane Hunter, Adding multimedia to the semantic web: Building an mpeg-7 ontology, Australia, 2011.
Yong Rui et al, Relevance feedback techniques in interactive content-based image retrieval, Urbana, IL 1998.
Jia-Yu Pan et al, Automatic multimedia cross-modal correlation discovery, 2004.
Ziyou Xiong et al, Generation of sports highlights using motion activity in combination with a common audio feature extraction framework, Cambridge, MA Sep. 2003.

\* cited by examiner

INTERACTIVE SYSTEM AND METHOD

CROSS REFERENCE TO RELATED APPLICATIONS

The present application is a Continuation of U.S. patent application Ser. No. 13/161,820, filed Jun. 16, 2011, now U.S. Pat. No. 9,132,352, issued Sep. 15, 2015, which is a non-provisional of, and claims benefit of priority from U.S. Provisional Patent Application No. 61/358,232, filed Jun. 24, 2010, the entirety of which are expressly incorporated herein by reference.

FIELD OF THE INVENTION

This invention is directed at a system and method for processing and displaying image information.

BACKGROUND OF THE INVENTION

Modern televisions (and the source material they present) typically display two dimensional (2D) images. The images are presented a series of frames from a single perspective. However, recently, several advanced televisions have been developed. For example, three dimensional (3D) televisions enhance the viewing experience when used with three dimensional video sources. However, there are relatively few movies that are encoded in three dimensional format. Also, currently available cable, and telephone company based broadcast services do not provide three dimensional content (except anaglyph encoded), thereby reducing the value to the user of three dimensional televisions.

A technology has evolved in computer video graphics involving so-called graphics processor units (GPUs), which typically employ single instruction multiple data (SIMD) technology. Using a SIMD processor, a powerful simplified processor architecture exploiting parallel processing is provided, in which multiple processing elements perform the same operation ("instruction") on multiple data simultaneously. Many video cards use SIMD because similar transformations might need to occur to multiple pixels simultaneously. See Young, U.S. Pat. No. 6,429,903, incorporated herein by reference.

Hoffberg et al., U.S. Pat. No. 6,400,996, expressly incorporated herein by reference, teaches comparing two dimensional video images to three dimensional models.

Methods of converting two dimensional images and sets of images to three dimensions are known in the art. For example, Cipolla discusses an algorithm that can be used to generate a 3D model from two or more uncalibrated images. Cipolla's algorithm comprises the following four steps:

"1. We first determine a set of primitives—segments and cuboids—for which parallelism and orthogonality constraints are derived. These primitives are precisely localized in the image using the image gradient information.

"2. The next step concerns the camera calibration: the intrinsic parameters of the camera are determined for each image. This is done by determining the vanishing points associated with parallel lines in the world. Three mutually orthogonal directions are exploited.

"3. The motion (a rotation and a translation) between viewpoints are computed. The motion combined with the knowledge of the camera parameters allows the recovery of the perspective projection matrices for each viewpoint.

"4. The last step consists in using these projection matrices to find more correspondences between the images and then compute 3D textured triangles that represent a model of the scene."

Cipolla, "3D Model Acquisition from Uncalibrated Images," IAPR Workshop on Machine Vision Applications, Makuhari, Japan, 1998.

See also: Fehn, "An Evolutionary and Optimized Approach on 3D-TV," Proc. of IBC, 2002.

SUMMARY OF THE INVENTION

The present system and method permits users to have more interaction with their televisions and with broadcast programs. This is accomplished by coupling a graphics card or video card with a standard television connected to a cable or broadcast network. A television is provided that receives a video signal, and comprises a video graphic processor. The video graphic processor allows for the processing of incoming graphics from the video program. In a preferred embodiment, a SIMD processor which forms part of the video graphic processor is used to perform mathematical transforms on the video data to derive a moving 3D model (i.e., a 4D model) and permit modification of, and display of, a rendered version of the model. In one embodiment, the last several minutes (or hours) of a broadcast program are stored, and the user is permitted to perform trick play functions, such as rewind, and make modifications to the events in the program and to play out "what if" scenarios. That is, a model is formed of a set of objects in the video, and the model is modified by the user, and the result is a synthesis of the actual video program with the computationally derived alteration.

Many uses of this invention will be apparent to skilled persons in the art. For example, while watching sports games, fans often hypothesize that the game might have turned out differently if a player had made a slightly different move. In one embodiment, the instant invention will allow the fans to test such hypotheses.

In one embodiment, the television allows for the viewing of broadcast shows provided via cable, via a fiber optic network, over the Internet, or through a similar technology. In addition, the television can be connected either over a wire or wirelessly with a non-transitory computer memory storing videos, such as a DVD, CD, hard disk, or USB flash memory. The television comprises a video graphic processor which is preferably on a separate card having a PCIe-x16 bus, connected to a main processor on a motherboard. The television stores recently-played scenes and allows the viewer to rewind into the recently-played scenes and modify some of the movements taking place therein. Optionally, the television is a three dimensional television.

One embodiment a method implemented on a computing machine or processor. The processor receives as input information representing a first ordered set of images. In one embodiment, these are two dimensional images. In another embodiment, these are three dimensional images. In one embodiment, these could be a set of continuous image files in JPG or GIF89a format. Alternatively, these could be single or multiple ordered video files in MP4 (MPEG-4 video file) or .MOV (Apple QuickTime movie) format. Any set of ordered image files or single or multiple video files will typically suffice. Since one embodiment formulates a 4D model from the ordered set of images, a 3D image feed is preferred, but not required. The ordered set of images is analyzed to determine at least one position in more than two dimensions of space for an object represented in the images and at least one motion vector in two dimensions of space and one dimension of time. In the next step, a four dimensional representation of the information based on the at least one position and the at least one motion vector is generated.

The processor receives as input a parameter, which may be a modification of at least one spatial dimension at a first time. In response, the processor modifies the four dimensional representation at the first time. The processor also modifies the four dimensional representation at a second time, different from the first time, in response to the received parameter or modification and in accordance with at least one law of physics, thereby rendering information representing an ordered set of images.

For example, if at time T=1, a modification was made causing a child to drop a ball, at time T=2, the ball might be changed from remaining in the child's hands to being on the ground. This change would be in response to the modification and in accordance with a law of physics, the law of gravity. Finally, the processor would provide, as output, the information representing the second ordered set of images derived by exercising the 4D model and rendering it from a perspective. Preferably, this information would be in a video format, such as mp4 (MPEG-4 video file) or .MOV (Apple QuickTime movie) format. Alternatively, a set of image files, such as jpg or gif, could be used. The second ordered set of images could be 2D or 3D.

Persons skilled in the art will recognize many situations in which this could be useful. For example, the first ordered set of images could represent a part of a sports game, such as a key college basketball play. The model would then be useful to determine what would have happened, for example, had one of the players passed the ball instead of attempting to shoot it into the basket. In another embodiment, the invention could be used to model natural disasters, such as earthquakes or tornadoes and the efficiency of safety and protection mechanisms against such disasters. In yet another embodiment, the model could be used to represent car accidents and to ascertain whether an accident could have been avoided had one of the drivers had a better reaction time or chosen a different response to avoid the imminent collision.

The processor used to implement the invention can be any processor having a memory, an input, and an output. One embodiment of this invention can be implemented on a substantially arbitrary laptop or desktop computer running Microsoft Windows Vista, Microsoft Windows 7, Apple Mac Os X, or Linux. Another embodiment runs on a digital video recorder (DVR) that is connected to a television. The DVR stores the last several minutes or hours of the program currently being viewed and allows the user to make changes to the events that took place and run experimental scenarios through the interface of the remote control and the television screen.

In one more embodiment, the invention comprises machine instructions for the method described above stored on a non-transitory computer readable medium. This non-transitory computer-readable medium could be any device on which computer instructions or data are stored, for example, a USB flash memory drive, a CD, a DVD, or a RAM.

It is therefore an object to provide a method and system for implementation, comprising receiving information representing a first ordered set of images; analyzing the information, for example with an automated processor, to determine at least one position in more than two dimensions of space and at least one motion vector in at least two dimensions of space and one dimension of time of an object represented in the first ordered set of images; automatically developing a four dimensional model comprising greater than two spatial dimensions and one temporal dimension, obeying at least one predetermined physical law, of at least a portion of the information based on the at least one position and the at least one motion vector; receiving at least one parameter representing at least one spatial dimension for at least one instant in time; analyzing, using an automated processor, the four dimensional model in response to the received at least one parameter; and rendering at least information representing in the four dimensional model dependent on said analyzing.

It is also an object to provide a system and method for use, comprising a first input configured to receive information representing a first ordered set of images; at least one processor, configured to: analyze the information to determine at least one position in more than two dimensions of space and at least one motion vector in at least two dimensions of space and one dimension of time of an object represented in the first ordered set of images; automatically develop a four dimensional model comprising greater than two spatial dimensions and one temporal dimension, obeying at least one predetermined physical law, of at least a portion of the information based on the at least one position and the at least one motion vector; and analyzing the four dimensional model in response to at least one parameter representing at least one spatial dimension for at least one instant in time; and at output configured to present a rendering of the four dimensional model dependent on said analyzing.

The first ordered set of images may comprise a set of two dimensional images (e.g., a video or audio-visual presentation), or a set of three dimensional images. They may represent a part of a sports game, a natural disaster, or an accident (e.g., automobile accident). The first ordered set of images may comprise forensic data, and wherein the received parameter comprises a modified viewer perspective. The system and method may further comprise automatically generating the parameter based on a viewer perspective with respect to a display device.

The rendering may comprise rendering at least information representing in the four dimensional model in conjunction with a portion of the information representing the first ordered set of images.

The system may automatically modify, for the purpose of rendering the second set of images, the at least one physical law in response to detecting an inconsistency a motion of objects in the first set of images. The at least one physical law comprises, for example one of gravity, conservation of momentum, conservation of energy, and conservation of mass, and in realistic modeling, each of these laws may be respected.

The four dimensional model may comprise a volume and mass model corresponding to each of a plurality of physical objects represented in the first ordered set of images, a texture mapping model configured to impose appropriate surface textures derived and extrapolated from the first ordered set of images on each volume and mass model, and an interaction model representing interactions between the volume and mass models.

The at least one parameter may comprise a modification of at least one spatial or temporal relationship represented in the four dimensional model.

A human user-machine interface may be provided, configured to provide interactive feedback to the human user with respect to changes in the four dimensional model, based on changes in the at least one parameter.

The four dimensional model may be developed based on both past and future images, or past images only, of the first ordered set of images with respect to the at least one instant of time.

It is another object to provide a system and method are provided, comprising storing a computer model of at least one object in a physical scene in a memory, developed based on a physical scene, the computer model comprising at least three physical dimensions, a time dimension, and supporting at least one of gravity, conservation of momentum, conservation of energy, and conservation of mass; extracting a set of motion parameters for the at least one object in the computer model from a series of images; at least one of modifying and extrapolating the parameters for the at least one object; and rendering the at least one object with an automated processor, using the at least one of modified and extrapolated parameters as a modified or extrapolated scene.

A further object provides a system and method, comprising generating a computer model representing four dimensions in accordance with the laws of physics, of at least one object in a physical scene represented in a series of images; defining a set of motion parameters for the at least one object in the computer model independent of the series of images; and rendering the at least one object with an automated processor, in accordance with the defined set of motion parameters.

The physical scene may be represented as an ordered set of two or three dimensional images.

The physical scene may be derived from a sports game, and the at least one object comprises a human player. The at least one object may also comprise a projectile object.

The at least one of modified and extrapolated parameters may result in a rendering of the at least one object from a different perspective that that from which the model is derived.

The computer model may be generated based on at least one of an audio, acoustic and video representation of the scene.

The at least one of modified and extrapolated parameters may comprise altering a parameter associated with gravity, of momentum, energy, and mass.

The physical scene may be analyzed to determine at least inconsistency which a law of physics.

The computer model may comprise a four dimensional model represents a volume and a mass representation corresponding to each of a plurality of physical objects represented in an ordered set of images.

The computer model may comprise a texture mapping model configured to impose appropriate surface textures derived and extrapolated from an ordered set of images.

The computer model may comprise an interaction model representing physical contact interactions between at least two different objects.

A human user-machine interface configured to provide interactive feedback to the human user may interact with a human user, with respect to an effect of the modifying and extrapolating of the motion parameters for the at least one object on the rendering of the at least one object.

DETAILED DESCRIPTION OF THE PREFERRED EMBODIMENT

Example 1

Sports Game Modeling Embedded in a Video Game System

One embodiment of this invention involves a substantially arbitrary television connected with a video card located inside a video game system, such as a personal computer operating under Microsoft Windows 7 or Linux or Unix, an Apple Macintosh computer executing under OSX, the Sony PlayStation, Microsoft Xbox 360, or the Nintendo Wii. The connection between the television and the video game system could be wired. Alternatively, a wireless connection could be used.

Figure 1:
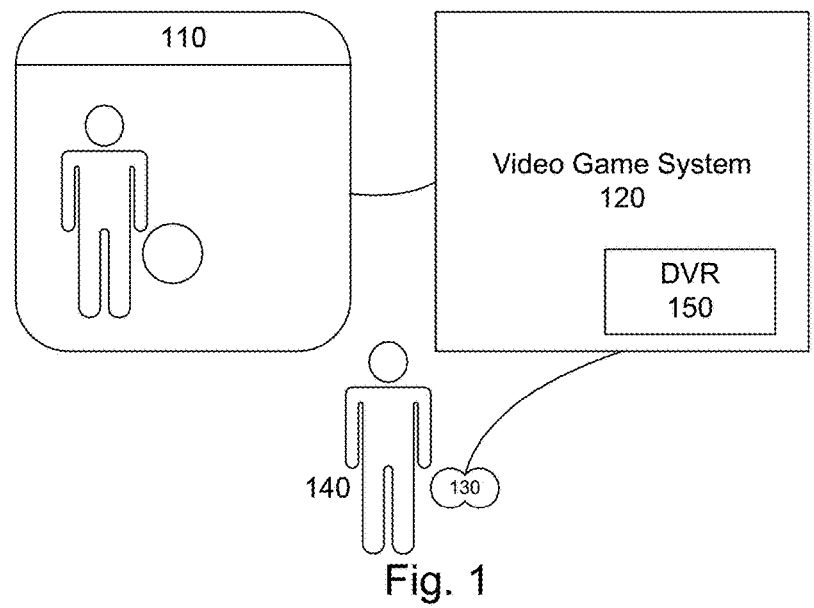
FIG. 1 illustrates a system according to one embodiment of the invention, where the DVR and video card are external to the television.

FIG. 1 illustrates a system embodying this invention. A television 110 is connected by wire to a video game system 120, comprising a video graphic processor device.

Video graphic processors are manufactured by Nvidia Corporation, ATI, and Intel Corporation, among others, and are preinstalled in many laptop computers, desktop computers, and video game systems. A video card or graphics card is an expansion card whose function is to generate and output images to a display. Many video cards offer added functions, such as accelerated rendering of 3D scenes and 2D graphics, video capture, TV-tuner adapter, MPEG-2/MPEG-4 decoding, light pen, TV output, or the ability to connect multiple monitors. Other modern high performance video cards are used for more graphically demanding purposes, such as PC games.

As an alternative to having a video card, video hardware can be integrated on the motherboard or even with the central processing unit as an integral part or separate core.

The system with the video card could be connected to the monitor through several known standards. For example, a video graphics array (VGA) analog-based standard could be used. Alternatively, a digital visual interface (DVI) could be provided. In one embodiment, a high-definition multimedia interface (HDMI) is used. Persons skilled in the art will undoubtedly recognize other methods of forming this connection. For example, a wireless connection over a Bluetooth, WiFi, infrared or microwave network or other wired or wireless connections might be used.

The video game system is connected by wire or wireless communication to a handheld user control panel 130. The control panel could include a keyboard, mouse, game controller, joystick or other buttons such that the user 140 can interact with the television to make changes to the spatial dimensions of the items shown on the screen. The video game system also comprises a digital video recorder (DVR) 150, which continually stores in a circular buffer or other buffer type the program being viewed, e.g., for up to 4 hours. DVRs are manufactured by TiVo, Inc. in Alviso, Calif., as well as by several other businesses, and are described in detail in Barton et al, U.S. Pat. No. 6,233,389, incorporated herein by reference. In another embodiment, the DVR 150 could be external to the video game system 120. However, the DVR 150 is preferably communicatively coupled to the video game system 120, such that the video game system could get information about what was recently played on the television. DVRs that are integrated with LCD screens are also known in the art. See, e.g., Park, US App. 2009/0244404, expressly incorporated herein by reference. An embodiment could be implemented by coupling Park's DVR/LCD screen combination with an external video card, for example in a video game playing system. More generally, a video input is received and a sequence of frames stored for joint analysis. The user is provider with two interfaces: a first interface configured to view the video program (usually with a synchronized audio program as well) and a second interface to manipulate the system, e.g., to input parameters regarding an intended modification of the objects represented in the video stream. According to another embodiment, the input parameter is automatically derived from a position or perspective of the viewer with respect to the display (e.g., the first user interface), and therefore the second interface is not an interactive feedback visual interface, such as a graphic user interface (GUI).

In other embodiments of the invention (not illustrated) any of the wired connections depicted in FIG. 1 may be replaced by wireless connections using Bluetooth, infrared, microwave, WiFi (IEEE-802.11a/b/g/n etc.) or similar technology. In yet another embodiment, the television 110, video game system 120, and DVR 150 are all one, single unitary system. In yet another embodiment, the control 130 might be replaced either by buttons on the television or video game system or by a touch screen. In yet another embodiment, the video game system may be replaced with a computer running software designed to implement an embodiment of the invention. The computer could be running Microsoft Windows 7, Apple OS X, Linux, or most other currently available operating systems.

The embodiment of a television with a touch screen is discussed in detail below. Basic touch screen systems with two dimensional screens are known in the art. For example, the ELO Touchsystems provides capacitive, resistive and acoustic devices. The Apple iPhone has a touch screen user interface, as do various other smartphones and consumer electronic appliances. A two dimensional television can implement a similar touch screen device.

However, the touch screen is a problem for three dimensional televisions. In three dimensional screens, unlike two dimensional screens, each point on the screen does not map to an image. Rather, the image is based on three factors: (1) the location of the viewer's left eye, (2) the location of the viewer's right eye, and (3) the position on the screen. Thus, the three dimensional television must locate the left eye and right eye of the viewer in order to ascertain which object the viewer is attempting to manipulate with the touch screen. The left and right eyes of the viewer can be located a using a camera communicatively connected to the screen. The distance to the eyes can then be calculated using the focal length, thereby rendering a representation of the position of the person's eyes. An analysis may also be performed to determine the gaze focus of the viewer. If, for example, the user has amblyopia, then the axis of a single eye may be employed to determine the user's object of attention.

To implement the present invention, the DVR 150 would store the last several minutes of the program being watched. If the user 140 views a scene that he would like to remodel, he presses an appropriate button or enters the appropriate command in control 130. The user is then able to rewind or fast forward through scenes stored on the DVR until he finds a scene that he wishes to modify. When he finds such a scene, the user may pause the program and, using the control 130, change at least one of the dimensions in the scene. For example, the user may create or modify a wind, or he could cause a person in the scene to drop an object instead of continuing to hold it.

Figure 15:
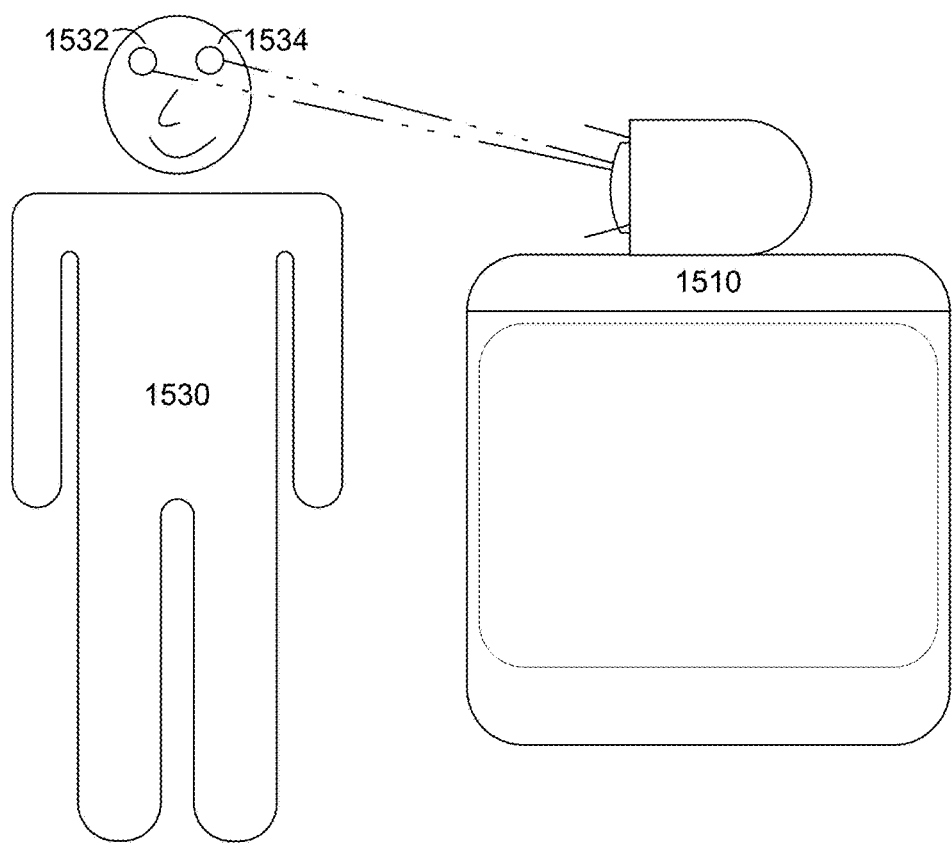
FIG. 15 illustrates a mechanism by which a 3D touch screen device ascertains the position of a user, in accordance with one embodiment of the invention.

FIG. 15 illustrates the three dimensional touch screen idea in detail. A camera 1520 is placed on top of a three dimensional screen 1510. The camera 1520 can ascertain the position and gaze of the eyes 1532 and 1534 of the user 1530. The screen knows where the user touches it through the conventional touch screen technology. See, e.g., Heidal, U.S. Pat. No. 5,342,047, expressly incorporated herein by reference, describing a touch screen machine.

In another embodiment, if the three dimensional television requires the viewer to wear special glasses, the glasses could have a position sensor (relative to the television) attached to them.

Figure 6A:
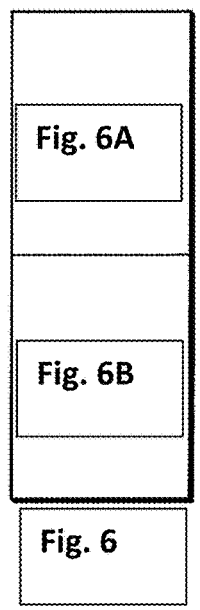
FIGS. 6A and 6B illustrate the operation of a touch screen machine, in accordance with one embodiment of the invention.
Figure 6A:
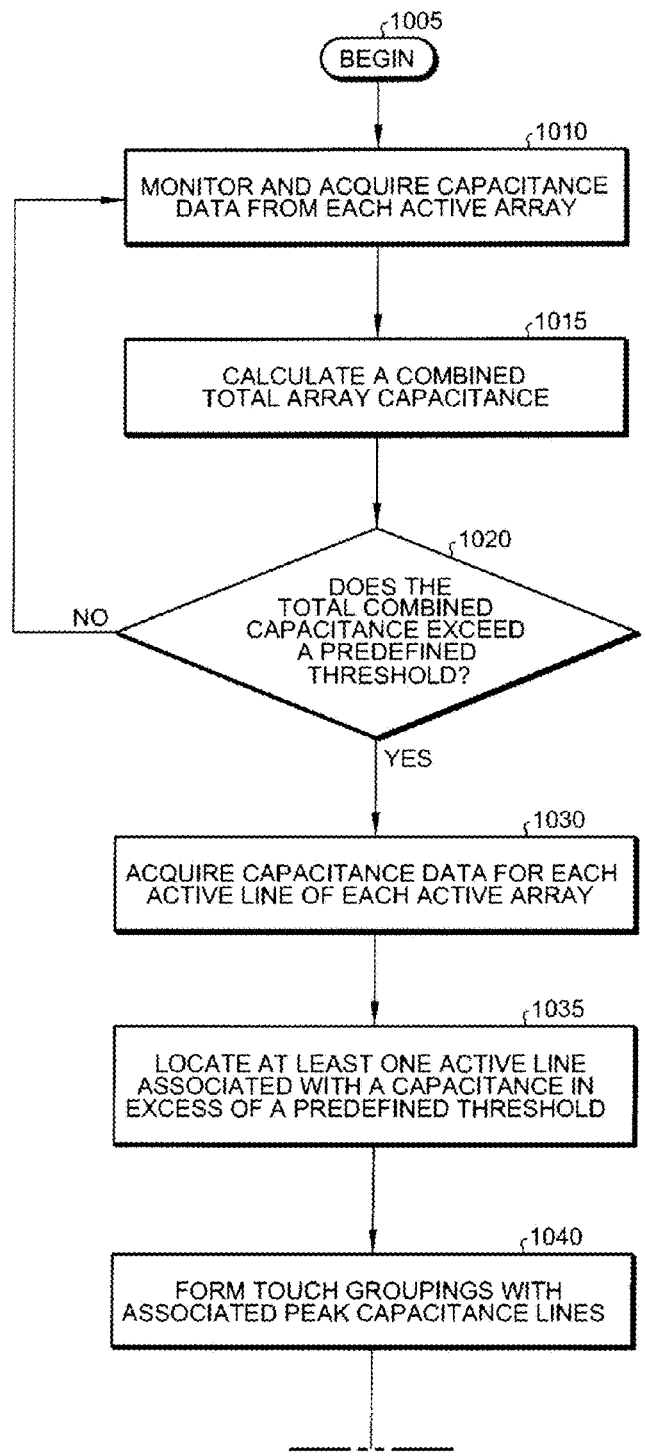
Figure 6B:
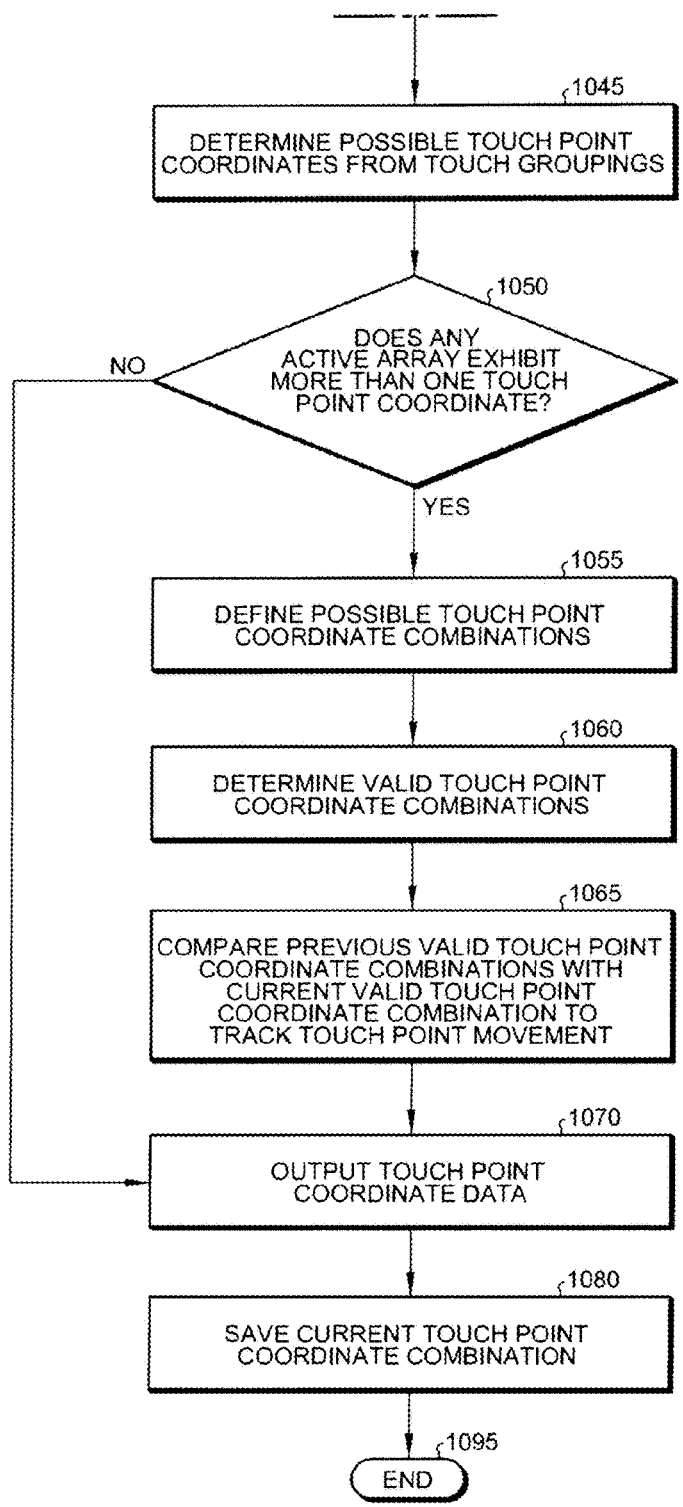
Figure 10:
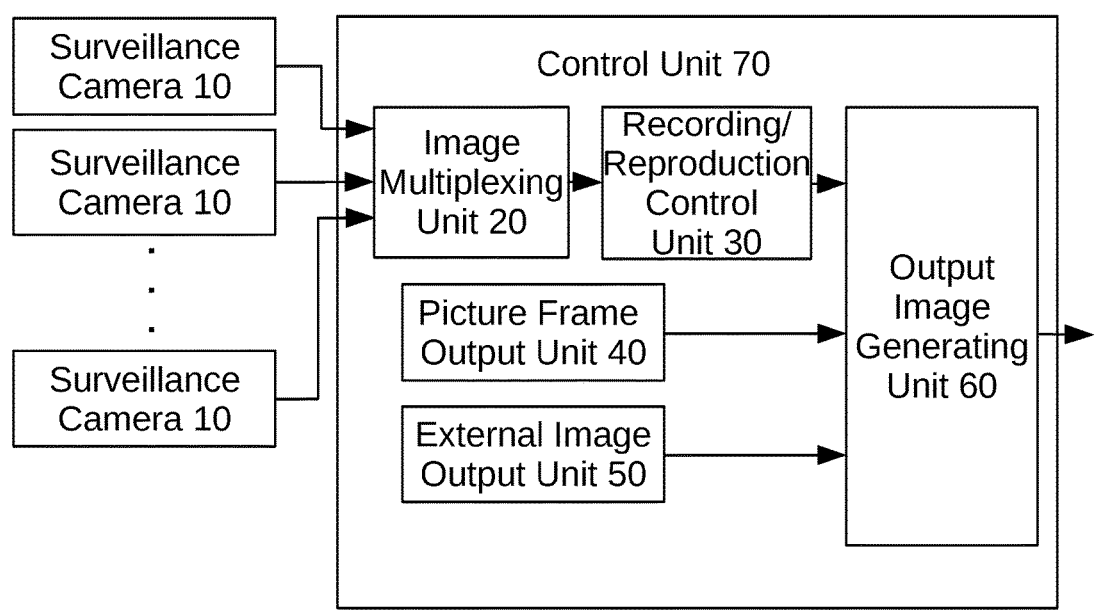
FIG. 10 is a block diagram of a digital video recorder (DVR)-integrated display device having a picture-in-picture (PIP) function according to an exemplary embodiment of the invention.

FIG. 6, copied from FIG. 10 in Ningrat, US App. 2010/0066701, expressly incorporated herein by reference, is a flowchart illustrating methods of implementing an exemplary process for identifying multiple touches in a multi array capacitance based touch screen. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of elements or means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

A method for determining valid or true touch point locations begins 1005 with monitoring and acquiring capacitance data from each active array included in the system. Using the collected data a combined capacitance is calculated 1015 and compared to a predefined threshold. When the total exceeds 1020 the predefined threshold, a touch is declared to have occurred. If the total fails to exceed the threshold, the system continues to monitor total capacitance until circumstances are such that a touch occurs.

With the declaration of a touch occurring, capacitance data from each active array within the system is gained 1030 for further analysis. Within each array active lines whose capacitance level exceeds a predefined threshold and whose capacitance level is greater than both adjacent lines 1035 is identified as a local peak. Once these local peaks are identified, the capacitance values of each adjacent line is compared to the peak value to determine whether the capacitance of the adjacent line is within a predefined range of the local peak. When an adjacent value is within the range, that adjacent line is considered part of the peak channel.

Having identified the peak channel 1035, a touch grouping is formed 1040 by combining lines adjacent to each peak channel. Capacitance values associated with each line of the touch grouping are used to determine 1045 estimated touch points using, for example, by a weighted average statistical analysis. Based on the number of estimated touch points, a determination 1050 is made whether a single or multiple touch point condition exists. When a single touch occurs each array will have only one estimated touch location. However, when any of the active line arrays produce more than one estimated touch point, the system assumes a dual or multiple touch as occurred. Thus in a dual touch situation the above described process will produce for each active line array at least two estimated touch positions.

From the estimated touch points of each array possible touch point coordinate combinations are created 1055. As previously described some of these combinations are ghost or false locations. In a dual touch four possible coordinate combinations exist of which two are false and two are correct. Using a coordinate relationship between the three active arrays, valid touch point coordinates are determined 1060. The valid touch point coordinates are compared to a previously stored set of valid touch point coordinates, and when the new touch points occur within a specific period of time and within a specific window of interest with respect to the previous touch points, touch point tracking can be invoked 1065.

Thereafter the location of the valid touch points is output to a processor, screen or other input/output terminal. As one skilled in the art will recognize the touch screen of the present invention can be coupled with a variety of display and input mechanisms as well as computing systems. Using an underlying screen correlated with the touch screen, data inputs can be gained and results displayed. Finally the newly defined touch point locations are stored in memory 1080 for touch point tracking purposes ending the process.

As one skilled the relevant art will recognize, the data produced by this method can be used by any type of microprocessor or similar computing system. For example, one or more portions of the present invention can implemented in software. Software programming code which embodies the present invention is typically accessed by the microprocessor from long-term storage media of some type, such as a CD-ROM drive or hard drive or flash memory. The software programming code may be embodied on any of a variety of known media for use with a data processing system, such as a flash memory stick, diskette, hard drive, CD-ROM or the like. The code may be distributed on such media, or may be distributed from the memory or storage of one computer system over a network of some type to other computer systems for use by such other systems. Alternatively, the programming code may be embodied in the memory, and accessed by the microprocessor. The techniques and methods for embodying software programming code in memory, on physical media, and/or distributing software code via networks are well known.

Figure 2:
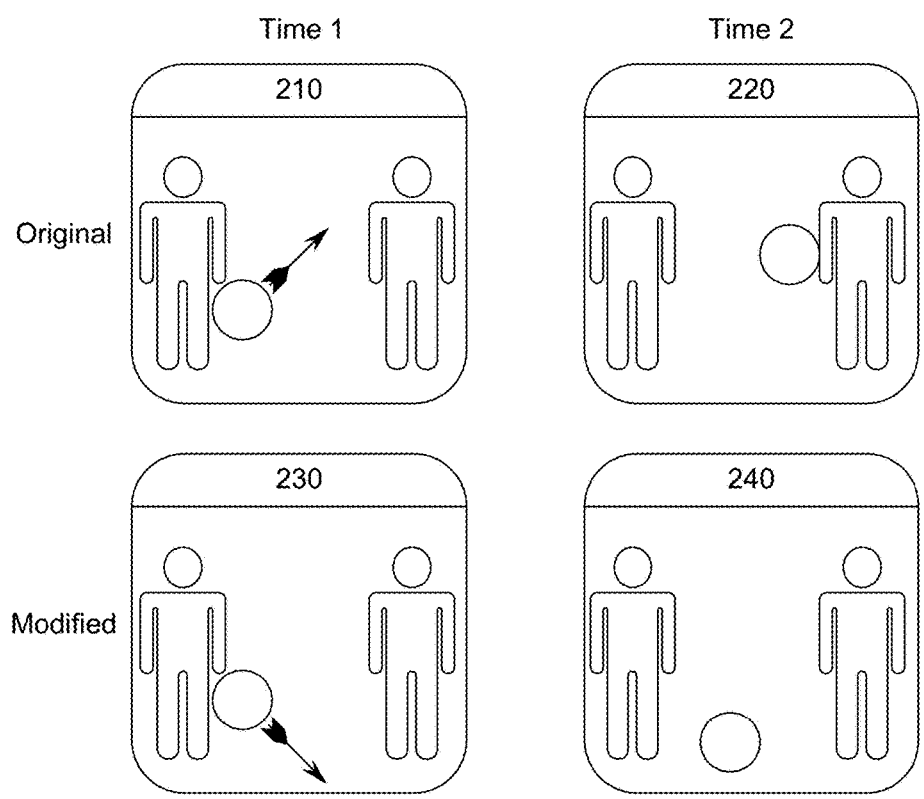
FIG. 2 illustrates a set of television screen transforms, in accordance with at least one law of physics, according to one embodiment of the invention.

FIG. 2 illustrates four screen shots. Screen shots 210 and 220 are from an original video of a boy and a girl playing with a ball. In Screen shot 210, which takes place at a first time, the boy tosses the ball to the girl. He directs the ball to the right and in a slightly upward direction, such that the force of gravity would cause the ball to be at approximately the height of the girl's arms when the ball reaches her. In screen shot 220, which takes place at a second time, which is later than the first time, the girl catches the ball, in response to the boy's toss.

In screen shot 230, the user decided to modify the scene at time 1 to cause the ball to be dropped instead of tossed by the boy. To do this, the user caused the boy to merely release the ball from his hand instead of tossing it. To do this, the user would have used the control 130 to select the boy's fingers and cause them to separate from the ball and to select the boy's hand and prevent it from making a toss.

As a result, the forces acting on the ball at time 1 in screen shot 230 are now different. In screen shot 210, there was an upward and rightward push by the boy as well as a downward force of gravity. Now there is only a force of gravity (and air resistance) acting on the ball. This causes a change in the motion vector of the ball at time 1. Instead of moving up and to the right as in screen shot 210, the ball will now fall straight down in screen shot 230. Also note that the girl will no longer be able to catch the ball. The video game system 120, knowing that the girl is acting to catch the ball, will no longer cause the girl to stretch out her arms in anticipation of the ball, as in Fig. 220. Instead, she will merely stand in her place. In one embodiment (not illustrated) the girl might run toward the boy in an attempt to catch the ball before it hits the ground. However, the girl might not do this if it is in violation of the rules of the game or if the processor implementing the invention decides that such running would be futile.

Screen shot 240 shows what the scene looks like at time 2. Notice that, instead of being tossed to and caught by the girl, as in screen shot 220, the ball has hit the ground and come to rest thereon. Therefore, the user's modification caused a change in the appearance of the scene in at least two times—time 1 and time 2. Note that a law of physics, here the law of gravity, was taken into account to ascertain the ball's position at time 2. Gravity teaches that objects that are not attached to something fall to the ground. Here, the ball was not attached after the boy released it, so it fell to the ground.

A potential implementation difficulty here is that the scenes in the example are pictured in two dimensions on a two dimensional television. Fehn teaches a method of displaying real images, which are viewed in three dimensions, on a three dimensional TV. See C. Fehn. 3D TV Broadcasting. In O. Schreer, P. Kauff, and T. Sikora, (Editors): 3D Videocommunication, John Wiley and Sons, Chichester, UK, 2005.

Under Fehn's stereoscopic view synthesis, depth-image-based rendering (DIBR) is defined as the process of synthesizing "virtual" views of a real-world scene from still or moving images and associated per-pixel depth information. Conceptually, this novel view generation can be understood as the following two-step process: At first, the original image points are reprojected into the three-dimensional world, utilizing the respective depth values. Thereafter, these intermediate space points are projected into the image plane of a "virtual" camera, which is located at the required viewing position. The concatenation of reprojection (2D-to-3D) and subsequent projection (3D-to-2D) is usually called 3D image warping.

Consider a system of two pin-hole cameras and an arbitrary 3D point $M=(x, y, z, 1)^T$ with its projections $m_l=(u_l, v_l, 1)^T$ and $m_r=(u_r, v_r, 1)^T$ in the first, and, respectively, the second view. Under the assumption that the world coordinate system equals the camera coordinate system of the first cameral, the two perspective projection equations result to:

$$z_l m_l = K_l[I|0]M$$

$$z_r m_r = K_r[R|t]M$$

where the 3×3 matrix R and the 3×1 vector t define the rotation and translation that transform the space point from the world coordinate system into the camera coordinate system of the second view, the two upper triangular 3×3 matrices $K_l$ and $K_r$ specify the intrinsic parameters of the first, and respectively the second camera and $z_l$ and $z_r$ describe the scene depth in each respective camera coordinate system.

Rearranging the above equation gives an affine representation of the 3D point M that is linear dependent on its depth value $z_l$:

$$M=z_l K_l^{-1} m_l$$

Substituting the above equations then leads to the classical affine disparity equation, which defines the depth-dependent relation between corresponding points in two images of the same scene:

$$z_r m_r = z_l K_r R K_l^{-1} m_l + K_r t$$

This disparity equation can also be considered as a 3D image warping formalism, which can be used to create an arbitrary novel view from a known reference image. This requires nothing but the definition of the position t and the orientation R of a "virtual" camera relative to the reference camera as well as the declaration of this synthetic camera's intrinsic parameters K. Then, if the depth values z of the corresponding 3D points are known for every pixel of the original image, the "virtual" view can—on principle—be synthesized by applying these equations to all original image points.

The simple 3D image warping concept described in the last section can of course also be used to create pairs of "virtual" views that together each with comprise a stereoscopic image. For that purpose, two "virtual" cameras are specified, which are separated by the interaxial distance tc. To establish the so-called zero-parallax setting (ZPS), i. e. to choose the convergence distance zc in the 3D scene, one of two different approaches, which are both in regular use in today's modern stereo cameras, can be chosen. With the "toed-in" method, the ZPS is adjusted by a joint inward-rotation of the left- and the right-eye camera. In the so-called "shift-sensor" approach, shown in FIG. 2.4, a plane of convergence is established by a small shift h of the parallel positioned cameras' CCD sensors (Woods et al. 1993). C. Fehn. 3D TV Broadcasting. In O. Schreer, P. Kauff, and T. Sikora, (Editors): 3D Videocommunication, John Wiley and Sons, Chichester, UK, 2005.

Figure 8:
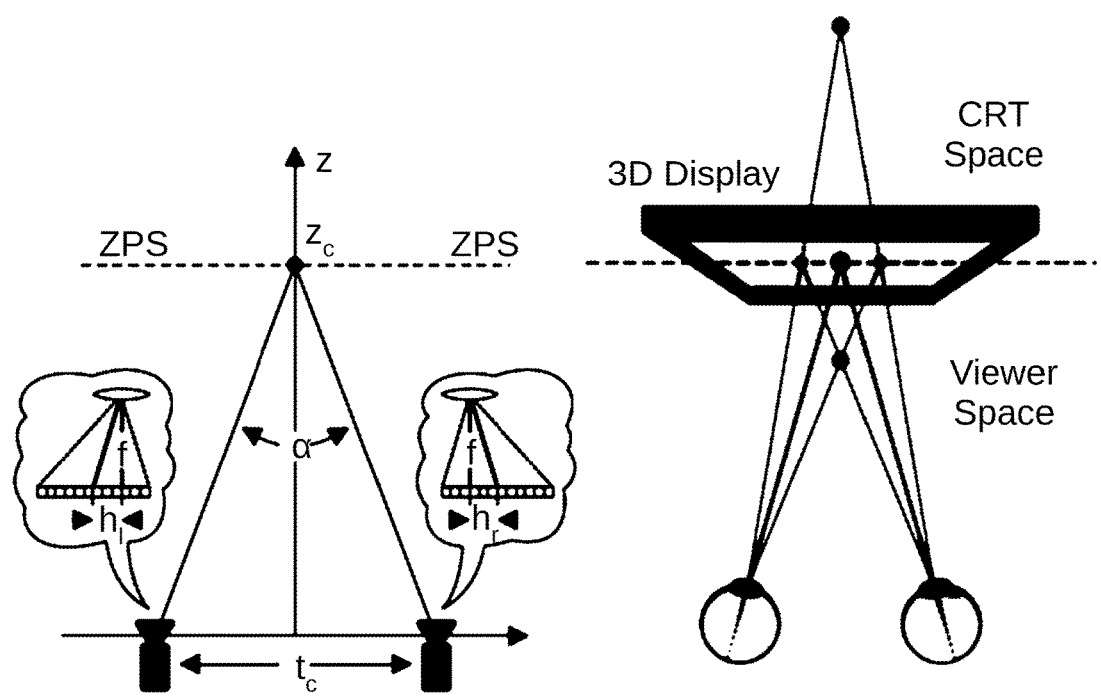
FIG. 8 is an illustration of 3D display technology according to one embodiment of the invention.

FIG. 8, copied from C. Fehn, 3D TV Broadcasting, In O. Schreer, P. Kauff, and T. Sikora, (Editors): 3D Videocommunication, John Wiley and Sons, Chichester, UK, 2005, illustrates a "shift sensor" stereo camera and the respective three-dimensional reproduction on a stereoscopic or autostereoscopic 3D TV display.

In other embodiments, more complex scenes could be modeled and more complex changes could be made. For example, a full professional or college football game could be modeled. As a result, people would be able to test hypothesis, such as, "Michigan would have won the game had Jacobson not dropped the ball." In a preferred embodiment, the processor would have, in its memory, a model including a representation of the heights, weights, and key features of all of the players on the teams. Also, the dimensions of each stadium where games are played would also be available either locally or over the Internet. The processor would also know all of the rules of the game and the object of the game. Thus, it would be able, using the model, to synthesize action, even if it is not present in a source set of images. For example, using live game action up to a point in time as a predicate, a user may alter the game by moving an object, and the processor could thereafter direct players to act accordingly. In a preferred embodiment, some room for error would be allowed. For example, if a certain basketball player can make 70% of the baskets when he tosses the ball standing 10 yards away, the model would use a random variable to ascertain that the tosses are successful in 70% of the cases. Thus, one aspect of the embodiment allows a merger between broadcast entertainment, such as sports, and user-controlled game play.

Preferably, the system accesses the Internet and the data about the sports players is stored in an online database, in a format such as XML or other machine-readable format. However, persons skilled in the art will recognize other means of storing data, for example, Microsoft Excel format, comma delimited text files or Oracle databases. In another embodiment, the database could be stored local to the processor.

It should also be noted that, in one embodiment, this processor can be used to simulate a sports game from the beginning. As the heights, weights, and key features of all of the players, as well as the data regarding the sizes of all of the stadiums, are accessible to the system, the simulated game would be a mere extension of the method where the starting position is the typical starting position for the game and the first motion vector is the first movement of the game. For example, the system and method could be used to recreate a match between the 2010 football teams of the University of Michigan and Ohio State University in the University of Michigan's "Big House" stadium. Because the weather conditions on the day of the game are known, those can also be recreated. Alternatively, the user could select to change the weather conditions.

Figure 9:
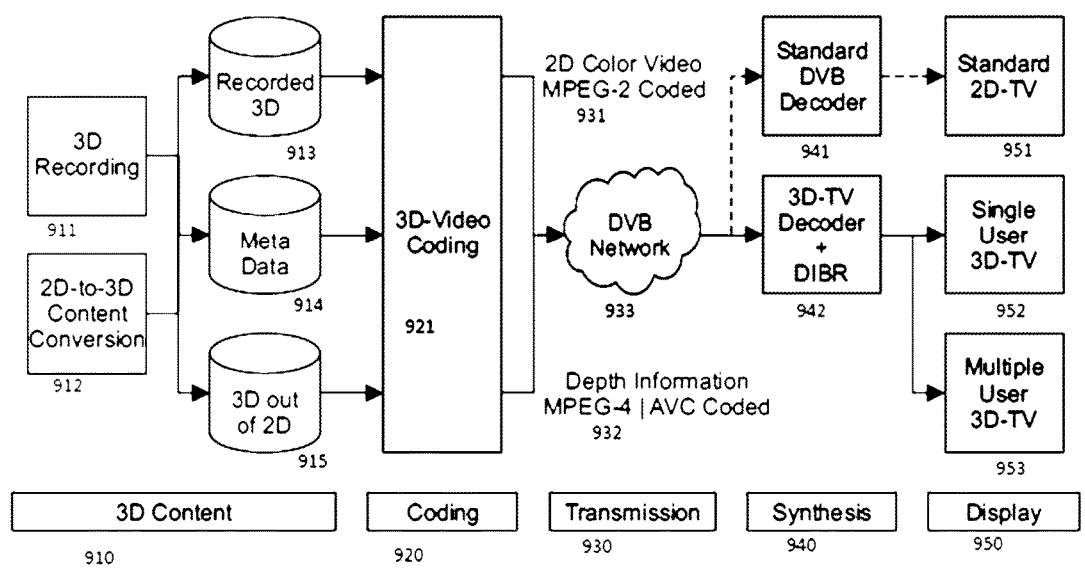
FIG. 9 is an implementation of a 3D television broadcast system according to one embodiment of the invention.

FIG. 9, copied from C. Fehn, 3D TV Broadcasting. In O. Schreer, P. Kauff, and T. Sikora, (Editors): 3D Videocommunication, John Wiley and Sons, Chichester, UK, 2005 (reference numbers added by applicant), illustrates the data transmission chain in a 3D television broadcast system that takes legacy 2D televisions into account. The system consists of five stages: 3D content creation 910, 3D video coding 920, transmission 930, "virtual" view synthesis 940, and 3D or 2D display 950.

The idea is that one starts with a set of 3D content 910, which comes from either a 3D recording 911 or a 2D-to-3D Content Conversion 912. This data is converted to either recorded 3D 913, meta data 914, or 3D out of 2D 915. The coding layer 920 then provides a 3D video coding in 921. The transmission layer 930 receives as input a 2D color video coded in MPEG-2 931 and depth information associated with this video coded in MPEG-4 or AVC 932. This information is provided as input to the digital video broadcasting (DVB) network 933. The DVB network 933 provides output to the synthesis layer 940. This output is read either by a standard DVB decoder 941 and then viewed on a standard 2D TV 951 or by a 3D-TV decoder with depth-image-based rendering (DIBR) 942, which provides output to either a single user 3D-TV 952 or a multiple user 3D-TV 953 in the display layer 950. Note that there is a difference between single user 3D-TVs 952 and multiple user 3D-TVs 953 because 3D televisions provide two outputs—one for the left eye and one for the right eye. Therefore, users must be seated in an optimal location, rather than in any arbitrary location, to optimize the viewing experience. Also note that, while on a 2D screen, every pixel must have a color only, on a 3D screen every pixel must have both a color and a depth. Depth is typically represented as an image in grayscale, where each grayscale color has a value between 0 and 255. Points that are very near to the camera appear white ($z=0$) while points that are far from the camera appear black ($z=255$). C. Fehn, 3D TV Broadcasting, In O. Schreer, P. Kauff, and T. Sikora, (Editors): 3D Videocommunication, John Wiley and Sons, Chichester, UK, 2005.

Other methods of 2D-to-3D video conversion are known in the art. For graphics-heavy content, the geometry data needs to be re-rendered for two eyes' worth of perspective rather than one. This approach was used in the 3D remake of the movie *The Polar Express*. With traditionally captured images, the 2D to 3D conversion is far more involved, and the results are far less predictable. For example, in the 3D remake of Tim Burton's *The Nightmare Before Christmas*, which the director created using stop-motion 2D image capture of miniature physical models, the studio did a frame-by-frame digitization of the entire film. This required morphing each frame into a two-eye counterpart. However, a problem with these methods of 2D-to-3D conversion is that these result in relatively poor depth perception and are not similar to real 3D images. Also, many modern 3D theaters require viewers to wear special-purpose glasses, and the image appears unusual unless the viewer holds his head still and look directly at the screen through the entire program. See, generally, Dipert, Brian, "3-D: nifty," EDN, Feb. 22, 2006; Dipert, Brian, "3-D stop motion: well-deserved promotion," EDN, Oct. 31, 2007; Dipert, Brian, "Coming soon: 3-D TV," EDN, Apr. 8, 2010.

Example 2

Sports Game Modeling as a Feature of a "Smart" Television (Internal Video Graphic Processor Card and DVR)

Figure 3:
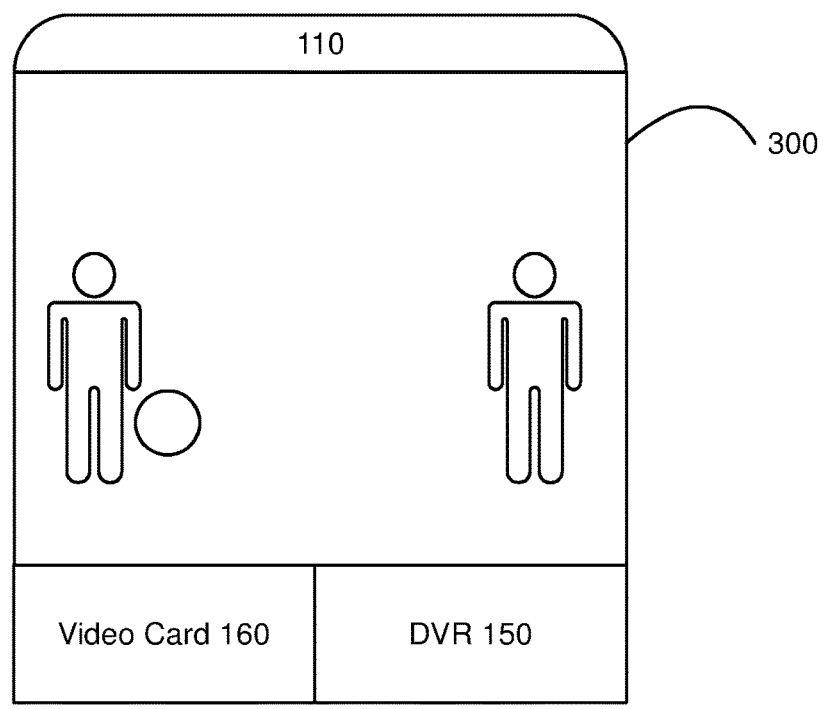
FIG. 3 illustrates a system according to one embodiment of the invention, where the DVR and video card are internal to the television.
Figure 3:
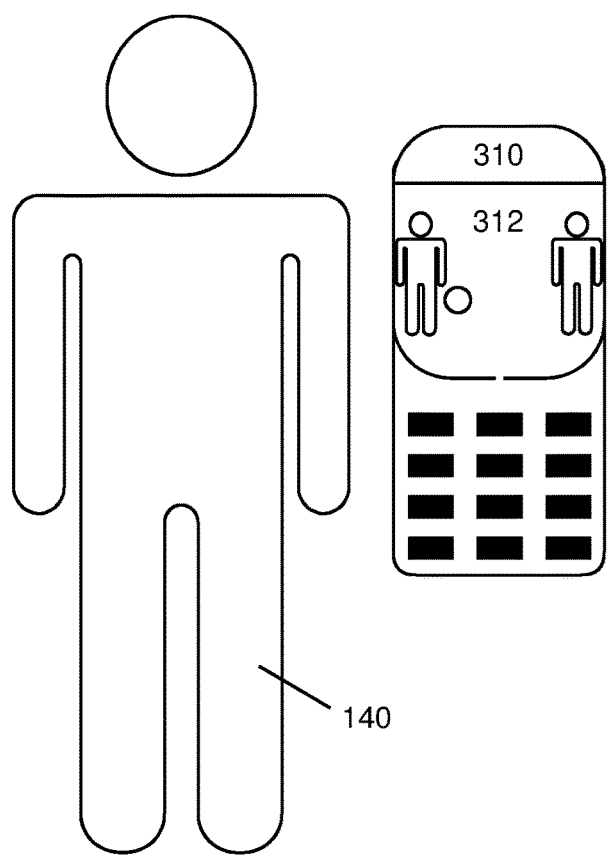

Another embodiment of this invention, as illustrated in FIG. 3, involves a "smart" television system 300 featuring a television screen 110 with an internal video graphic processor card 160 and DVR 150. One advantage of this system is that it can be designed specifically to implement the invention, and, therefore, the remote control can have buttons or commands to facilitate the user's operation of the invention. Alternatively, the television could have a touch screen or other user input, such as a six axis input (x, y, z, phi, theta and rho, e.g., combining accelerometers or absolute positioning and gyroscopes) allowing the user to reposition the features thereon to implement the invention. In yet another embodiment, the television could, wirelessly or through wires, connect to a computer or smart phone with a touch screen or other suitable user input, on which the scene would be reconfigured and sent back to the television. Yet another embodiment involves a "smart" remote control, 310 with a touch screen element 312 featuring a miniature copy of the scene on the TV for user editing.

Optionally, the user can be provided with the ability to zoom in and to zoom out either using specially dedicated buttons or by moving two fingers toward each other to zoom in and moving two fingers away from each other to zoom out. (This is similar to the zoom control on the Apple iPhone). In one embodiment, when not in use, the smart remote control's mini display can be turned off. In another embodiment, the smart remote control's mini display can also function as an internet access tablet, similar to the display on an Apple iPad PDA or a Sony Dash clock radio; indeed, an iPod Touch itself could be used as the remote control user input device.

The moving of objects in a paused scene would be done in a typical "drag and drop" mechanism. A user would pick up an object at a first location and drop it at a second location elsewhere on the screen. In a two dimensional screen, the third dimension may be represented as the size of the object—as an object gets closer to the user, it appears bigger in size. Another issue is hidden surface extrapolation, which may occur with the surfaces that are located behind an object that is moved. In one embodiment, the processor predicts what might be found at that location (based on other images of the same scene in the same television program) or the processor could fill the gaps with a background (e.g. alternating light grey and dark grey lines) or even advertisements.

Figure 5:
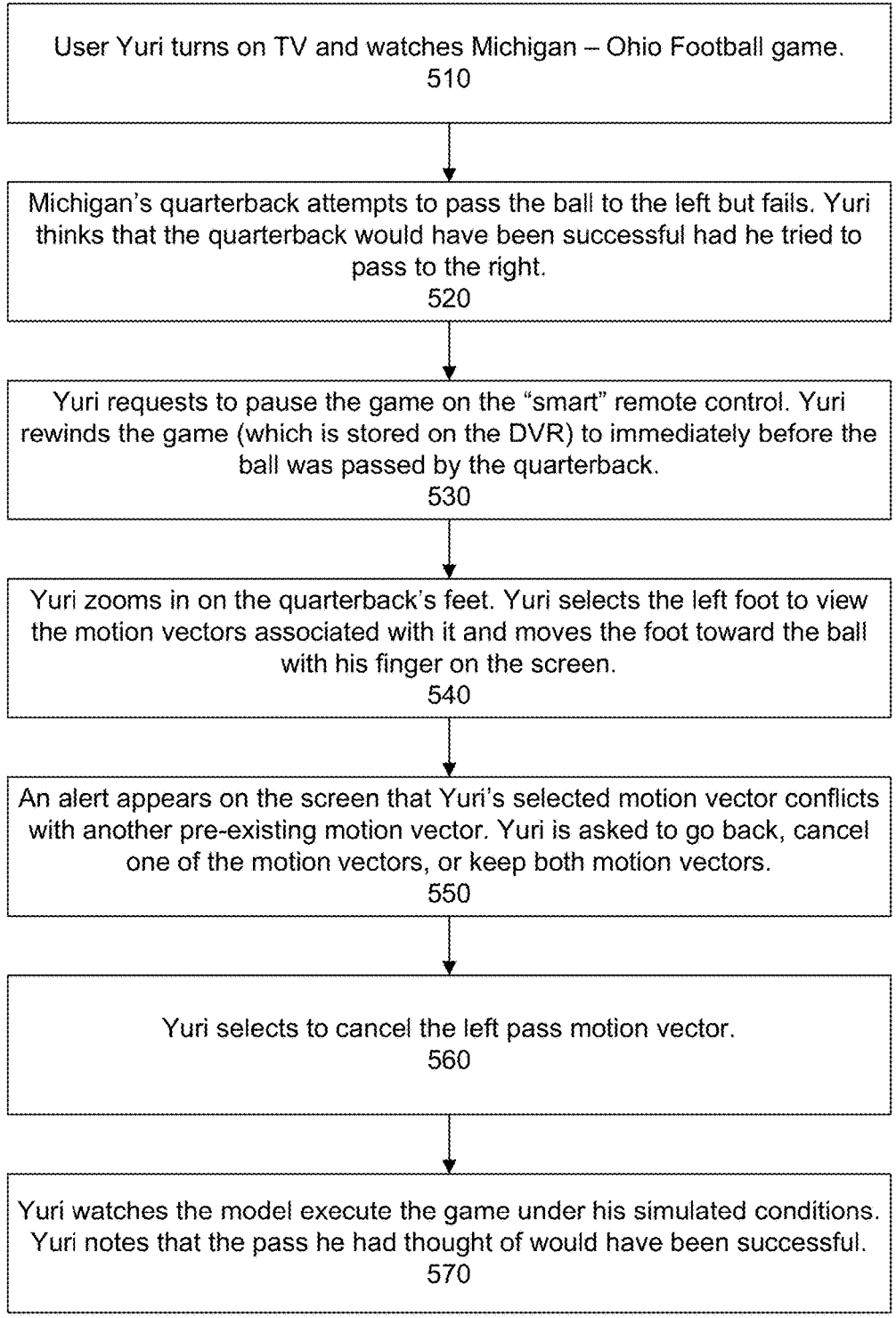
FIG. 5 is a flowchart of an implementation of one embodiment of the invention that could be used to model a sports game.

FIG. 5 is a flow chart describing an interaction of a user, Yuri. In step 510, Yuri is watching the Michigan-Ohio football game on his 3d TV at home. Yuri's TV is specially configured, as illustrated in FIG. 3, and includes an internal DVR and video card, which could of course also be external and either nearby or remote. Further, a 2D television may also implement this invention.

In step 520, Yuri notices that Michigan's quarterback attempted to pass the ball to the left but failed, leading to the Ohio team getting the ball. Yuri thinks that this was a stupid move, and that the quarterback would have been successful had he passed to the right instead. Yuri decides to recreate the play, with this alteration, to test his thesis.

In step 530, Yuri takes out his "smart" remote control, which includes a miniature copy of the TV screen 310 located thereon (as illustrated in FIG. 3). Because the game is being stored on the DVR as Yuri is watching, Yuri is able to rewind the game to immediately before the quarterback passed the ball to his left. Yuri zooms in to the quarterback's feet and selects the left foot. In a preferred embodiment, the selection is done on the miniature screen of the smart remote control, which can also function as a touch screen. However, persons skilled in the art will note alternative embodiments. For example, if the invention is implemented on a computer, such as a HP Pavilion DV4T laptop running Windows 7, the mouse can be used to zoom into and select an appropriate part of the image. Alternatively, if a video game console is providing the video card, the video game console's remote control could provide a method for zooming in and selecting a body part. In yet another embodiment, a 2d or 3d TV could have a touch screen located on itself.

After Yuri selects the left foot, in step 540, Yuri is shown an arrow corresponding to the motion vector of the left foot and is given an opportunity to modify this motion vector. Yuri takes the arrow and moves it to the right, thereby re-aiming the pass in the other direction.

After Yuri makes the selection, in step 550 an alert appears on the screen that Yuri's selected motion vector conflicts with another pre-existing motion vector, such as a tackle going in for a sack whose own path intersects the new position of the quarterback's left foot. Yuri is asked to go back, cancel or modify one of the motion vectors, or keep both motion vectors and permit a collision. In step 560, Yuri selects to maintain the repositioning of the left foot and permit the collision. The processor then exercises the model in accordance with the revised starting conditions, rules of play, and laws of physics, such as gravity, conservation of momentum, conservation of energy and mass, and game logic, and allows the revised play to continue. The system then determines the likelihood that the pass was completed, and the injuries, if any suffered by the players and possibly penalties. If the pass is probably caught, the visual depiction is, for example, of a completed play and the likely end of the down.

In one embodiment of the invention (not illustrated), the processor takes some time to make the calculations necessary to display the result of the model to the user. While the user is waiting, the processor may present the user with at least one advertisement. The advertisement could be downloaded from the television station, an on-line or local source, or provided by the manufacturer of the device. In one embodiment, the device is connected to the Internet and can download advertisements from the Internet. In one embodiment, the advertisements are interactive and allow the user to provide input through the remote control, video game controller, or other inputs during the presentation of the advertisement.

In step 570, Yuri watches the model execute the game under his simulated conditions. Yuri notes that the pass he had thought of would have been successful.

Combining an LCD screen and a DVR is known in the art. See, e.g., Park, US App. 2009/0244404, expressly incorporated herein by reference. Park teaches that such a device could be useful in a security/surveillance scenario. A plurality of cameras would be monitored on a single screen in a central location. The video of the activity at each of the areas would be stored on the DVR to be displayed on a television or provided to law enforcement authorities.

FIG. 10, copied from Park's (US App. 2009/0244404) FIG. 1, shows a block diagram of a digital video recorder (DVR)-integrated display device having a picture-in-picture (PIP) function. This device could be used to implement an embodiment of the invention, if coupled with an appropriate a video graphic processor card and other computation and user interface hardware and software.

Referring to FIG. 10, the DVR-integrated display device includes a plurality of surveillance cameras 10, an image multiplexing unit 20, a recording/reproduction control unit 30, a picture frame output unit 40, an external image output unit 50, an output image generating unit 60, and a control unit 70.

The plurality of surveillance cameras 10 are installed in particular areas to be monitored and take pictures of the areas. Thus, an administrator can monitor the areas by pictures taken by the surveillance cameras through a monitor in real time.

The image multiplexing unit 20 multiplexes a visual signal output from each surveillance camera 10, and outputs a multiplexed image frame or an image frame selected by a user from the visual signals output from the plurality of surveillance cameras 10.

The recording/reproduction control unit 30 records an image frame output from the image multiplexing unit 20, reproduces the image frame later, or processes the image frame to be displayed in real time.

The picture frame output unit 40 reads data stored in a memory and outputs the data as a picture frame. Various advertising contents are stored in the memory and output as picture frames from the picture frame output unit 40.

When an external image is input to the external image output unit 50, the external image output unit 50 determines whether the external image is an analog image or a digital image. When it is determined that the external image is an analog image, the external image output unit 50 converts the input analog image into a digital image and outputs the converted digital image to the output image generating unit 60. The analog image or digital image input from the exterior may be a computer image or an image from a television tuner.

The output image generating unit 60 creates a composite PIP picture of an image frame output from the recording/reproduction control unit 30 and an image selected by a user and displays the composite PIP picture. That is, the output image generating unit 60 creates a PIP composite image frame with either the picture frame output from the picture frame output unit 40 or an external image output from the external image output unit 500 according to a user operation and displays the composite PIP picture.

The control unit 70 controls the entire display device which includes the image multiplexing unit 20, the recording/reproduction control unit 30, the picture frame output unit 40, the external image output unit 50 and the output image generating unit 60. The control unit may control operations of other elements by use of a serial bus such as an integrated circuit (I$^2$C) bus. The I$^2$C bus, which is also referred to as an Inter-IC bus, is a two-wire bidirectional serial bus that provides a communication link between integrated circuits. Below, each element in FIG. 10 will be described in detail with reference to FIGS. 11 to 14.

Figure 11:
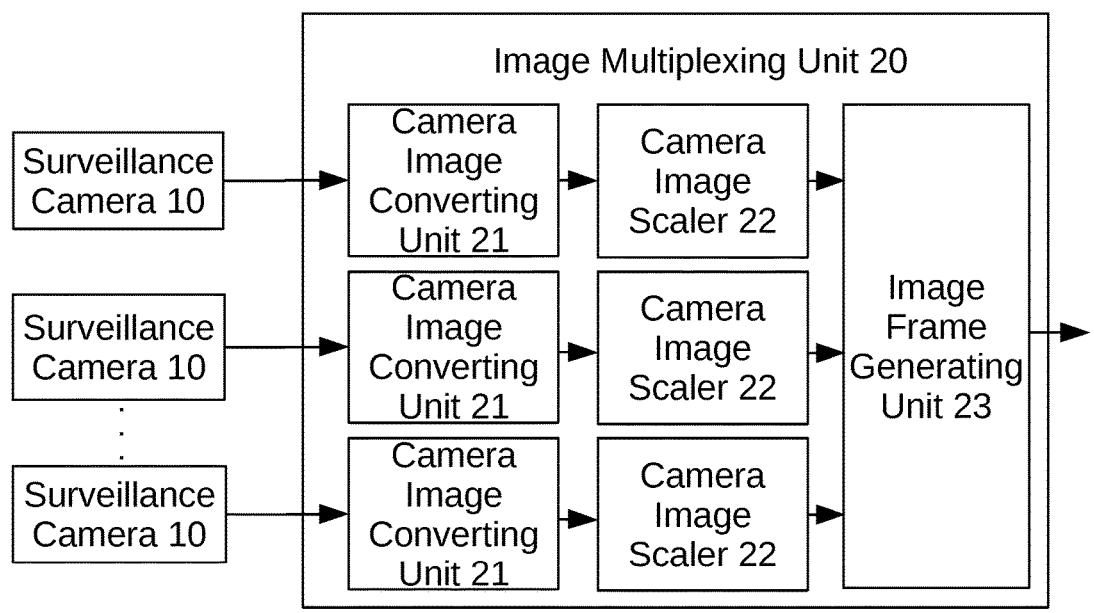
FIG. 11 is a block diagram of an image multiplexing unit according to an exemplary embodiment of the invention.

FIG. 11, copied from Park's (US App. 2009/0244404) FIG. 2, is a block diagram of the image multiplexing unit 20 according to an exemplary embodiment. As shown in FIG. 2, the image multiplexing unit 20 which multiplexes images output from the respective surveillance cameras 10 or generates a camera image as an image frame includes a camera image converting unit 21, a camera image scaler 22, and an image frame generating unit 23.

The camera image converting unit 21 converts a corresponding image output from each of the surveillance cameras 10 into a digital image in accordance with a standard format. For example, the camera image converting unit 21 may be a national television system committee (NTSC) decoder that converts an analog signal output from each of the surveillance cameras 10 into a digital signal.

The camera image scaler 22 adjusts the number of vertical and/or horizontal scanning lines of each digital image converted by the camera image converting unit 21 in accordance with an output format. For example, when an image from a surveillance camera 10 is displayed in full screen, or when a resolution of an image of the surveillance camera 10 is the same as a resolution of a monitor or a storage format, the camera image scaler 22 outputs the image from the surveillance camera 10 intact. However, when a screen divided into four sections is implemented on the monitor, the camera image scaler 22 interpolates and/or decimates the input image to reduce a resolution of the image from the surveillance camera 10 to a quarter of the original resolution. According to an operation mode, the camera image scaler 22 allows a monitor screen to be divided into a single section, two sections, four sections, eight sections, and so on to display a number of images from the plurality of surveillance cameras 10 in each divided section. The visual signal from each of the surveillance cameras 10 may be processed by the corresponding camera image converting unit 21 and the camera scaler 22.

The image frame generating unit 23 combines digital images that have been scaled by the camera image scaler 22 according to the operation mode, or generates an image frame from a selected digital image. The image frame generating unit 23 combines the digital images frame by frame such that the digital image generated by each of the camera image scalers 22 is output at a designated location on the monitor screen. Accordingly, each digital image is multiplexed by the frame image generating unit 23, or only the specific digital image is generated as an image frame to be output on the monitor screen.

Figure 12:
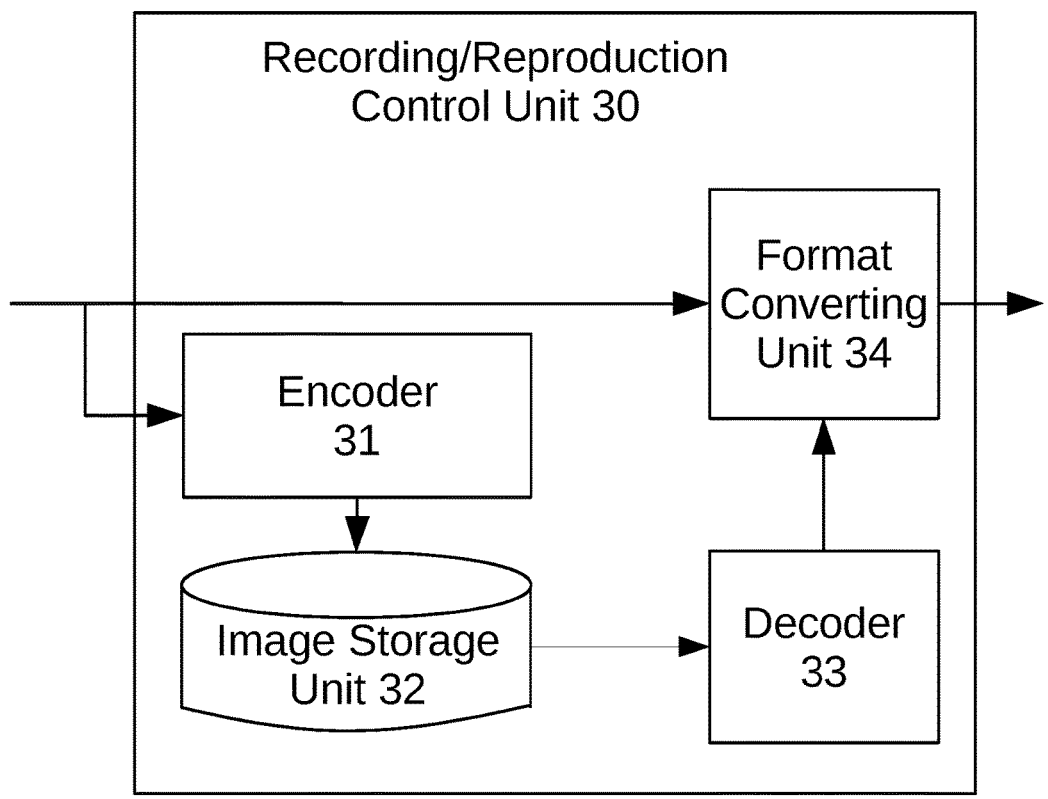
FIG. 12 is a block diagram of a recording/reproduction control unit according to an exemplary embodiment of the invention.

FIG. 12, copied from Park's (US App. 2009/0244404) FIG. 3, is a block diagram of the recording/reproduction control unit 30. As shown in FIG. 12, the recording/reproduction control unit 30 includes an encoder 31, an image storage unit 32, a decoder 33, and a format converting unit 34.

The encoder 31 encodes the image frame output from the image frame generating unit 23 according to an image compression standard such as MPEG (moving picture experts group) 4. MPEG4, which is audio-visual (AV) data compression technology enabling implementation of bidirectional multimedia, is a standard encoding image compression method that encodes the visual signal based on image contents. However, the type of image compression method is not limited to MPEG4, and other compression methods such as wavelet and H.264 can be employed.

The image storage unit 32 may be a non-volatile memory that retains data even when the power is off. Examples of the non-volatile memory include ROM (read only memory), Flash memory, and hard disk. The image storage unit 32 is a non-volatile memory that stores the image frame encoded by the encoder 31.

The decoder 33, which decompresses the compressed image, restores the image frame stored in the image storage unit 32. Such a decoder 33 is well-known technology and thus will not be described in detail.

The format converting unit 34 converts the image frame restored by the decoder 33 in accordance with a standard output format. Also, the format converting unit 34 converts a combined image frame or a selected image frame, each of which is output from the image frame generating unit 23, in accordance with a standard output format. That is, the format converting unit 34 converts the format of the image frame to output the visual signal in accordance with a standard output format such as RGB or a composite signal ($V_{com}$). Then, the image frame converted by the format converting unit 34 is output through the output image generating unit 600 to a picture frame type liquid crystal display (LCD) or a monitor screen, together with a picture frame output from the picture frame output unit 40 or an external image output from the external image output unit 50, by a PIP technique.

Figure 4:
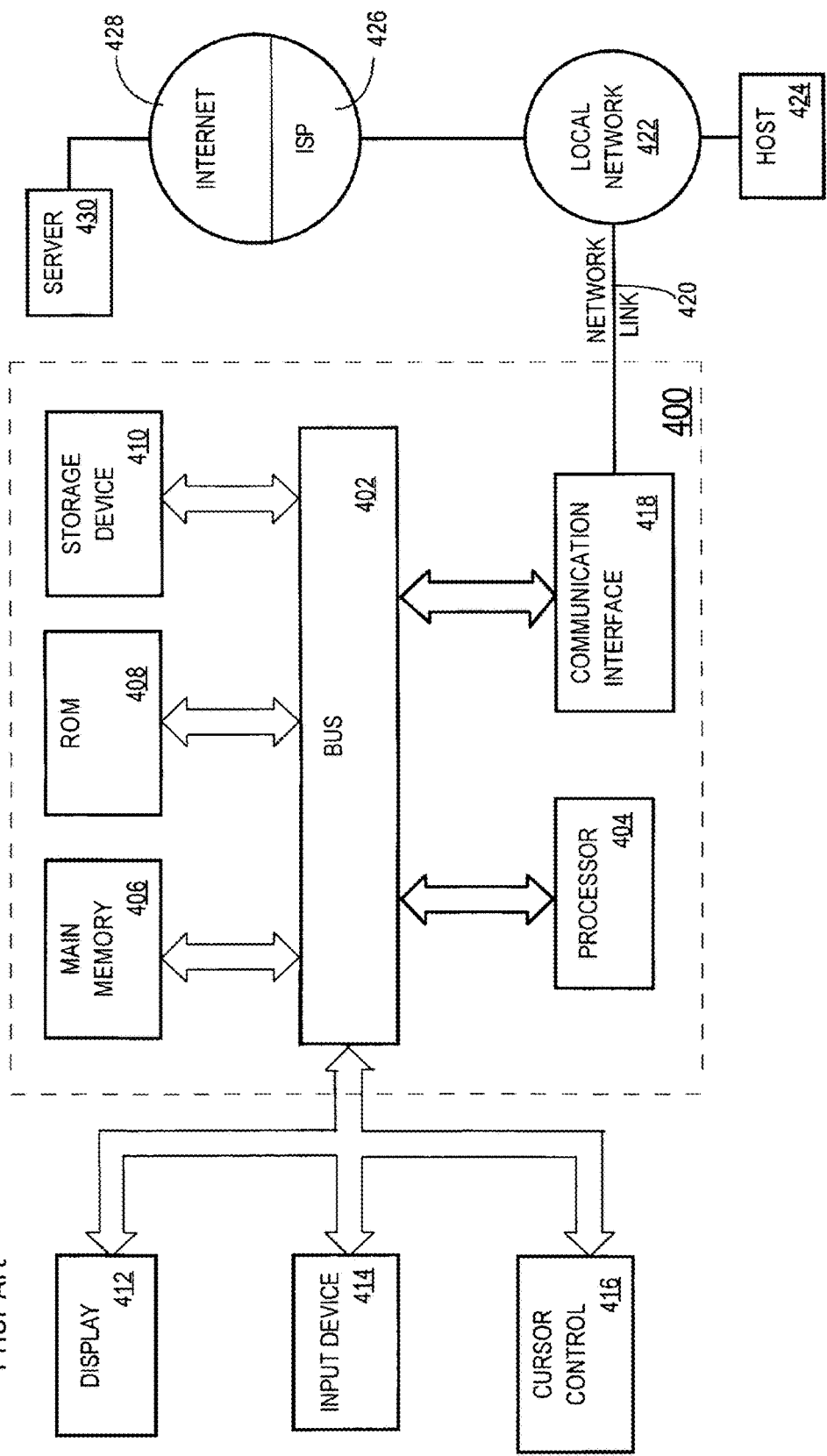
FIG. 4 illustrates a computer system that could be used to implement the invention.
Figure 13:
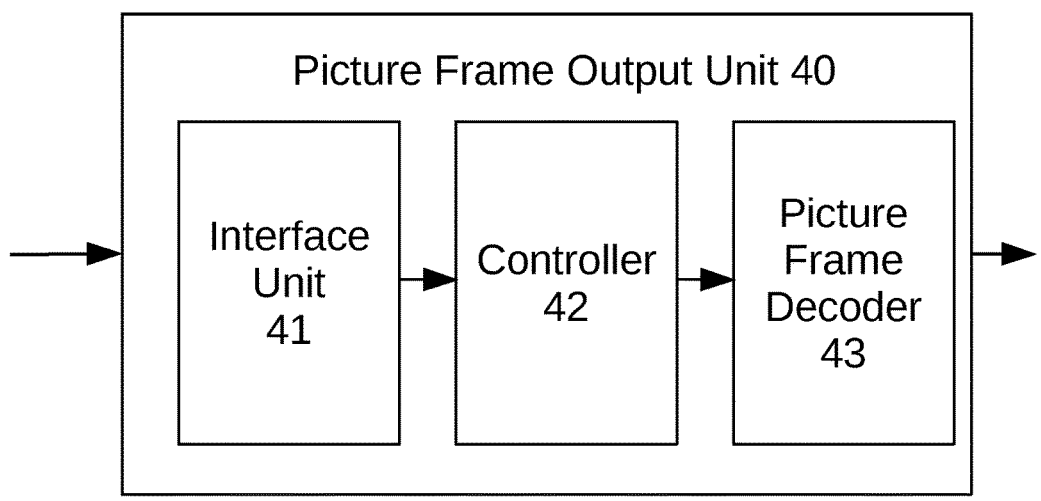
FIG. 13 is a block diagram of a picture frame output unit according to an exemplary embodiment of the invention.

FIG. 13, copied from Park's (US App. 2009/0244404) FIG. 4 is a block diagram of the picture frame output unit 40 according to an exemplary embodiment. As shown in FIG. 13, the picture frame output unit 40 includes an interface unit 41, a controller 42, and a picture frame decoder 43.

The interface unit 41 can establish communication with the memory through a parallel or serial bus.

The controller 42 reads data stored in the memory cluster by cluster, and transfers the read data to the picture frame decoder 43 cluster by cluster. The memory is installed inside or outside of the DVR-integrated display device, and the data stored in the memory may be various types of advertising contents such as multimedia including digital pictures, moving pictures, and music. As described above, when the internal or external memory is connected through the interface unit 41, the controller 42 outputs picture frame data stored in the memory according to an operation command of a user.

The picture frame decoder 43 reads and decodes the picture frame data output from the controller 42 and outputs the decoded picture frame image to the output image generating unit 60. Accordingly, the output image generating unit 60 outputs an image frame together with either the picture frame or the external image as a PIP picture using the elements shown in FIG. 14.

Figure 14:
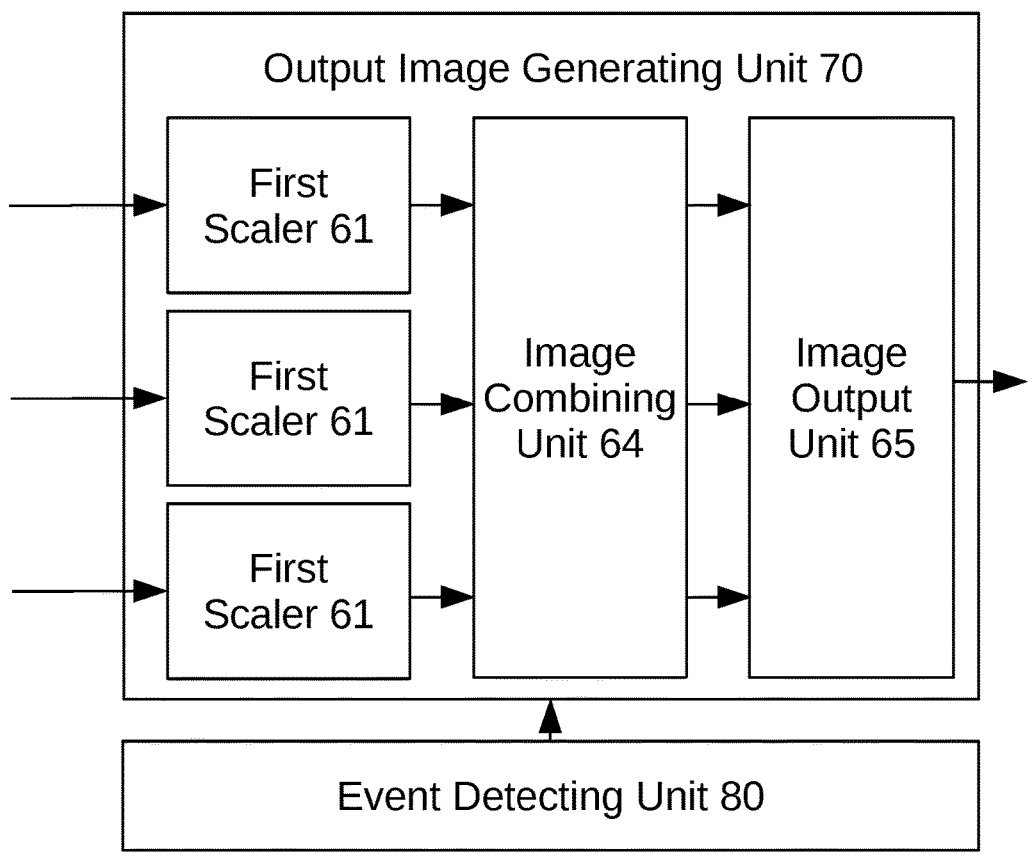
FIG. 14 is a block diagram of an output image generating unit according to an exemplary embodiment of the invention.

FIG. 14, copied from Park's (US App. 2009/0244404) FIG. 5 is a block diagram of the output image generating unit 60 according to an exemplary embodiment. As shown in FIG. 14, the output image generating unit 60 includes a first scaler 61, a second scaler 62, a third scaler 63, an image combining unit 64, and an image output unit 65.

The first scaler 61 scales an image frame converted by the format converting unit 34 of the recording/reproduction control unit 30.

The second scaler 62 scales an image frame output from the picture frame decoder 43 of the picture frame output unit 40, and the third scaler 63 scales an external image input from the external image output unit 50.

As described above, the external image output unit 50 determines whether the input external image is an analog image or a digital image. When it is determined that the input external image is a digital image, the external image output unit 50 transfers the digital image to the third scaler 63. Alternatively, when it is determined that the external image is an analog image, the external image output unit 50 converts the analog image into a digital image. More specifically, the external image output unit 50 converts an analog image input from a computer or a TV tuner into a digital image in a predetermined format such as YUV and outputs the converted digital image. The digital images output from the external image output unit 50 may be selectively scaled by the third scaler 63.

The above-described first scaler 61, second scaler 62 and third scaler 63 are selectively activated to perform scaling according to a user operation. That is, an image frame, a picture frame, and an external image are scaled by the respective scalers 61, 62, and 63 according to the user operation.

The scaled image frame, picture frame and external image are combined into a PIP picture by the image combining unit 64. In other words, according to the user operation, the image combining unit 64 combines the image frame and the picture frame into a PIP picture, or combines the image frame and the external image into a PIP picture. Subsequently, the image output unit 65 outputs the generated PIP picture on an LCD screen or a monitor screen.

In addition, the image output unit 65 may include a sharpness enhancement circuit and a contrast adjustment function allowing improvement of image quality of the generated PIP picture to be displayed on the LCD screen or the monitor screen.

According to another exemplary embodiment, an event detecting unit 80 may be further included to issue an event detection signal to the control unit 70 when an abnormal event is detected. The event detecting unit 80 may detect any events using, for example, a motion sensor, a door open sensor, and a damage sensor. That is, the event detecting unit 80 issues an event detection signal to the control unit 70 upon detection of an event. In response, the control unit 70 controls the output image generating unit 60 to display an image from the surveillance camera 10 installed in an area where the event is detected on the LCD screen or the monitor screen in full view.

It will now be described how to output images scaled by the first scaler 61, the second scaler 62, and the third scaler 63 when the event detecting unit 80 detects an event.

According to an exemplary embodiment, the output image generating unit 60 outputs the picture frame scaled by the second scaler 62 or the external image scaled by the third scaler 63 according to a user operation on the LCD screen or the monitor screen in full view when there is no event. However, the event detecting unit 80 issues an event detection signal to the control unit 70 upon detection of an event. In response, the control unit 70 controls the output image generating unit 60 such that DVR images taken by the plurality of surveillance cameras 10 are displayed on the LCD screen or the monitor screen in full view. Accordingly, the image combining unit 64 stops the image output unit from outputting the picture frame or the external image. Then, the image combining unit 64 transmits the image frame received from the first scaler 61 to the image outputting unit 65. In response, the image output unit 65 outputs a DVR image multiplexed into the image frames on the LCD screen or the monitor screen in full view. The image output unit 65 can not only output the multiplexed DVR image, but also output only image frames from the surveillance camera 10 at an area where the event is detected on the LCD screen or the monitor screen in full view. As described above, an administrator can monitor events immediately, even when he/she is engaged in other activities using the LCD screen or the monitor screen, for example, watching TV.

According to another exemplary embodiment, when no event is detected, the image combining unit 64 of the output image generating unit 60 combines the picture frame scaled by the second scaler 62 and the image frame scaled by the first scaler 61 according to a user operation such that the picture frame is output as a primary display and the image frame is output as a secondary display. Accordingly, the picture frame is output as the primary display on the LCD screen or the monitor screen, and the DVR image is output as the secondary display. However, when the event detecting unit 80 detects an event, the control unit 70 controls the output image generating unit 60 to output the image frame as the primary display. Consequently, the first scaler 61 scales the multiplexed image frame to fit the size of the primary display, and the second scaler 62 scales the picture frame to fit the size of the secondary display. Furthermore, the first scaler 61 may scale an image frame of an image taken by the surveillance camera 10 at an area where the event occurs to fit the size of the primary display. Then, the image combining unit 64 overlays the scaled image frame and picture frame to combine them, and transmits the combined image to the image output unit 65. Accordingly, the image output unit 65 outputs a PIP picture generated by combining the two images on the LCD screen or the monitor screen.

This DVR system may be used to capture images from multiple perspectives of a non-professional sports game, such as high school or college. The images may be processed to generate a three or four dimensional model of the game, and used as discussed above.

For example, if an LCD screen is installed at a crowded location such as a subway station, the LCD screen can simultaneously provide advertising contents in a picture frame and DVR images taken by surveillance cameras at locations throughout the station. As such, since the advertising contents and the DVR images taken by the surveillance cameras are displayed simultaneously on an LCD screen, vandalization of the high-priced LCD screen can be avoided.

Additionally, by displaying advertising contents together with DVR images on an LCD screen located in a blind spot where no surveillance camera is installed, potential vandals, thieves, etc. may believe that a surveillance camera is monitoring the area and be deterred from committing crimes.

According to another exemplary embodiment, when there is no event, the image combining unit 64 of the output image generating unit 60 combines the external image scaled by the third scaler 63 and the image frame scaled by the first scaler 61 such that the external image is output as a primary display and the image frame is output as the secondary display. Accordingly, the external image is output as the primary display and the DVR image multiplexed to the image frame is output as the secondary display. However, when the event detecting unit 80 detects the event, the control unit 70 controls the output image generating unit to output the image frame as the primary display. Accordingly, the first scaler 61 scales the multiplexed image frame to fit the size of the primary display and transmits the scaled image frame to the image combining unit 64, and the third scaler 63 scales the external image to fit the size of the secondary display and transmits the scaled external image to the image combining unit 64. Additionally, the first scaler 61 may scale an image frame of an image taken by the surveillance camera 10 installed at an area where the event occurs to fit the size of the primary display. Then, the image combining unit 64 combines the image frame scaled to the size of the primary display and the external image scaled to the size of the secondary display by overlaying the picture frame with the external image. Then, the image combining unit 64 transmits the combined images to the image output unit 65. Accordingly, the image output unit 65 outputs the images combined in a PIP manner on the LCD screen or the monitor screen.

For example, a security guard who manages the coming and going of vehicles watches TV with a primary display of a monitor screen and monitors DVR images taken by surveillance cameras installed on the premises and displayed on a secondary display of the monitor screen. When a vehicle enters the building, a motion sensor detects the motion of the vehicle, and the event detecting unit detects the sensing signal from the motion sensor and issues an event occurrence signal to the control unit 70. In response, the control unit 70 switches the images previously displayed on the primary display and the secondary display with each other. The TV image, previously displayed on the primary display, is output on the secondary display, and the DVR image, previously displayed on the secondary display, is output on the primary display. The DVR image output on the primary display of the monitor screen may be a multiplexed DVR image or a DVR image taken by a surveillance camera located at an area where an event occurs. Since the TV image and the DVR image displayed respectively on the primary display and the secondary display are switched with each other, the security guard can monitor the coming and going vehicles on the monitor screen.

For another example, in a convenience store or a grocery shop, advertisement of new products and a DVR image of an installed surveillance camera can be displayed at the same time through a monitor screen. Thus, new products can be advertised to customers through the monitor screen while DVR images from a surveillance camera deter shoplifting, robbery, etc.

As described above, an administrator can view DVR images output from a surveillance camera, and external images and/or a picture frame output from a computer or a TV tuner, on a single monitor, and switch the images between the primary display and the secondary display according to circumstances. Moreover, the above-described images can be combined as a PIP picture and then displayed on a single monitor screen or an LCD screen.

According to an exemplary embodiment, a DVR-integrated display device with a PIP function allows an administrator to monitor a plurality of sites where surveillance cameras are installed on a single monitor in real time and carry out another activity simultaneously. In addition, a DVR-integrated display device installed in public places can simultaneously provide images taken by a surveillance camera and advertising contents.

For example, in a convenience store, the DVR-integrated display device allows a clerk to monitor customers from images taken by a surveillance camera and displayed on the same monitor which is displaying a TV program. Thus, crimes like theft which could occur while the clerk is distracted by TV can be avoided.

Moreover, the DVR-integrated display device can output advertising contents about new products while displaying DVR images taken by a surveillance camera through a single screen. For example, a high-priced LCD display installed in a crowded place such as a subway station can display advertisements about a plurality of goods and services along with DVR images taken by a surveillance camera to help prevent theft or vandalization of the LCD display.

Adding a video card to the invention of Park, US App. 2009/0244404, described above would provide additional benefits. In addition to monitoring a location for criminal or violent activity, the DVR/monitor combination can be used to analyze alternative scenarios. For example, if a woman is robbed in a subway station, a DVR/monitor/video card combination could be used, not only to identify and prosecute the robber, but also to predict the weight, strength, and running abilities of a police officer who would have been able to prevent either the robbery or the escape of the robber. This data could be of assistance to cities assigning police officers to patrol dangerous neighborhoods.

Example 3

Automobile Collision Modeling

In another embodiment, this invention could be useful in automobile collision modeling when there are photographs or videos at least a part of the accident available. Note that, unlike prior art methods, which relied on expert analysis and skid marks on the road, in addition to the image data, this invention only relies on photographs and the modeling system described and claimed herein.

Figure 7:
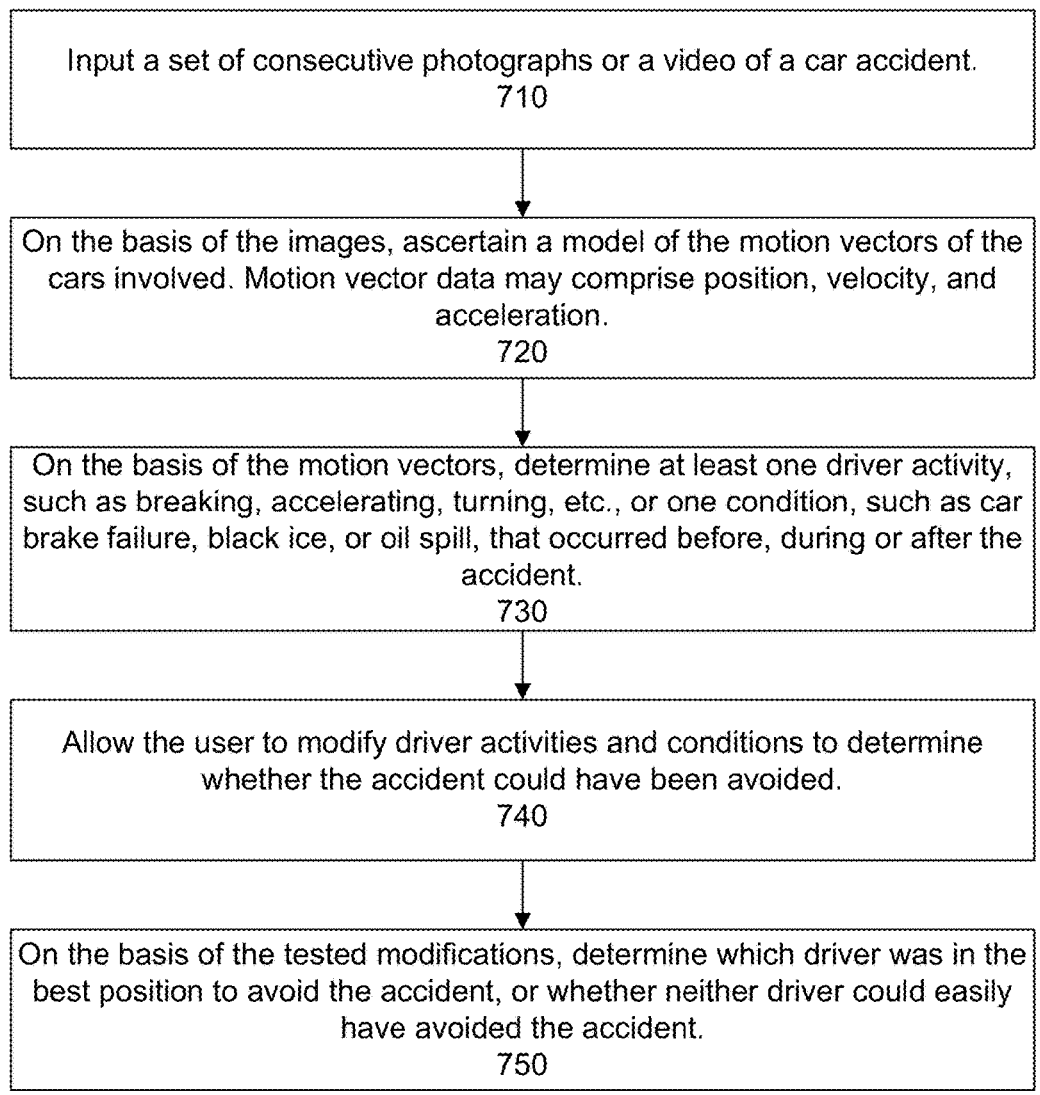
FIG. 7 if a flow chart of an implementation of one embodiment of the invention that could be used to model a car accident.

An exemplary embodiment of the invention is illustrated in FIG. 7. In step 710, the processor implementing the invention is provided as input either a set of consecutive photographs or a video of a car accident. In step 720, on the basis of these images, the processor ascertains a model of the motion vectors for the cars involved in the accident. The motion vectors could include information about position, velocity, and acceleration. If the accident occurred on an incline, for example on a downhill roadway, the motion vectors may take the acceleration due to gravity into account. If the accident occurred on a windy day, a wind motion vector may be included in the calculation.

In step 730, the motion vectors are analyzed to determine at least one likely driver activity. For example, if the car rapidly decelerated, it is likely that the driver hit the brakes. Other driver activities include accelerating or turning. The motion vectors may also be analyzed to predict existing conditions, such as a failure of a car's breaks, black ice, an oil spill, etc. These could have occurred before, during or after the accident being analyzed.

As demonstrated in step 740, the model can also be used to modify driver behavior and the resultant impact on the cars, for example, it could be ascertained whether one of the drivers could have swerved to avoid the accident, or whether the accident would have been preventable but for the black ice, etc. Persons skilled in the art will recognize that this feature is useful not only for ascertaining fault in an accident but also in driver education courses and in automotive design. For example, a student driver could be asked to determine an optimal reaction in an accident simulation and be shown the result of his choices. Also, it could be ascertained whether safety features such as seatbelts, ABS brakes, and traction control would have prevented a given accident.

Step 750 suggests that the model could be used to determine which driver was in the best position to avoid the accident, or whether the driver could easily have avoided the accident. Such calculations are useful for assigning fault, when applied in conjunction with local vehicle and traffic laws.

Example 4

Modeling of Special Effects

While the events in most movies follow the laws of physics, some movies and other television presentations feature special effects that violate at least one law of physics. For example, a movie about Jesus might feature Jesus walking on water even though, under the traditional laws of physics, the man would be expected to sink because he lacks buoyancy.

In one embodiment, when asked to provide a model of the events in this movie, the modeler would cause Jesus to drown.

However, in a preferred embodiment, the modeler would detect that Jesus walking on water is a special effect. As such, the model would not conform the special effect to the laws of physics. In yet another embodiment, the modeler would present the user with an option to conform or not to conform the special effect to the laws of physics.

In yet another embodiment, the user could be given an option to rewrite the laws of physics. For example, the gravitational acceleration near Earth's surface is approximately g=9.8 m/s². However, a user might wish to model what the game of football would be like if it were played on the moon, where the gravitational acceleration is approximately $g_{moon}$=1.6 m/s². In this case, the user could reset the value of g and watch the processor develop the game under the modified conditions.

Hardware Overview

FIG. 4, copied from U.S. Pat. No. 7,702,660, issued to Chan, is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In this description, several preferred embodiments of the invention were discussed. Persons skilled in the art will, undoubtedly, have other ideas as to how the systems and methods described herein may be used. It is understood that this broad invention is not limited to the embodiments discussed herein. Rather, the invention is limited only by the following claims.

What is claimed is:

1. A method, comprising:
    receiving at least one stream of input images representing a physical scene having three spatial dimensions and a temporal dimension, representing a movement of at least two natural objects in the physical scene, at least one of the at least two natural objects being alive;
    processing at least the at least one stream of input images, with at least one automated processor, to generate a spatial and temporal computer model of the at least two natural objects, moving and interacting according to a set of intrinsic parameters describing at least a first motion of the at least two natural objects in the physical scene, comprising both first independent motion and first contact between the at least two natural objects, consistent with the laws of physics comprising at least conservation of mass, conservation of momentum, and conservation of energy of the at least two natural objects;
    receiving a set of extrinsic parameters which are distinct from the set of intrinsic motion parameters, the set of extrinsic parameters describing at least a second motion of the at least two natural objects interacting in the physical scene, comprising both second independent motion and second contact between the at least two natural objects, the first independent motion being different from the second independent motion and the first contact being different from the second contact;
    receiving at least one statistic for a random variable associated with an outcome of the second motion and the second contact, comprising a likelihood of an injury to the at least one of the at least two natural objects which is alive, as a result of at least the set of extrinsic parameters;
    rendering the spatial and temporal computer model, with the at least one automated processor, to define a spatial and temporal representation of the at least two natural objects within the physical scene according to at least the set of extrinsic parameters, portions of the set of intrinsic parameters consistent with the set of extrinsic parameters, and a performance statistic for a predefined activity represented in the defined spatial and temporal representation; and
    generating a rendered output of the animated computer model, with the at least one automated processor, as at least one stream of output images defining at least two spatial dimensions and a temporal dimension.

2. The method according to claim 1, wherein the computer model is generated based on both the at least one stream of input images and an external database of characteristics of the at least one of the at least two natural objects.

3. The method according to claim 1, further comprising receiving the set of extrinsic parameters, by acquiring images through an input device comprising a camera.

4. The method according to claim 1, wherein said processing at least the at least one stream of input images comprises:
    creating a respective three dimensional spatial model of each of the at least two natural objects;
    extracting information representing non-hidden surfaces of the at least two natural objects in the at least one stream of input images;
    extrapolating information representing hidden surfaces of the at least two natural objects in the at least one stream of input images; and
    texture mapping surfaces of the respective three dimensional spatial models of the at least two natural objects based on the extracted information representing non-hidden surfaces in the at least one stream of input images and the extrapolated information representing the hidden surfaces.

5. The method according to claim 1, further comprising receiving a set of extrinsic parameters which are distinct from the set of intrinsic motion parameters, as movement information received through an input device comprising at least one of a an accelerometer and a gyroscope.

6. The method according to claim 1, wherein:
    the physical scene comprises a sports arena in which a competitive sports event occurs, having an interaction outcome;
    the at least two natural objects comprise at least one first human athlete competing against at least one second human athlete within the sports arena;
    the at least one stream of input images comprises televised video images of the at least one first human athlete competing against at least one second human athlete within the sports arena; and
    further comprising receiving a human user input comprising the set of extrinsic parameters to alter the interaction outcome.

7. The method according to claim 1, wherein:
    the at least natural objects comprise at least two human athletes competing according to a game having a set of rules;
    further comprising analyzing the at least one stream of input images to determine a compliance with the set of rules.

8. The method according to claim 1, wherein the generated rendered output comprises a stereoscopic video presentation.

9. The method according to claim 1, wherein the at least two natural objects in the physical scene comprise:
    at least one human athlete competing in a sports event; and
    at least one sports projectile object which interacts with the at least one human athlete as a part of the sports event.

10. A system for processing a stream of images, comprising:
    a first input port configured to receive at least one stream of input images representing a physical scene having three spatial dimensions and a temporal dimension, representing a movement of at least two natural objects in the physical scene;

at least one automated processor, configured to:
  process at least the at least one stream of input images to generate a spatial and temporal computer model of the at least two natural objects, moving and interacting according to a set of intrinsic parameters describing at least a first motion of the at least two natural objects in the physical scene, comprising both first independent motion and first contact between the at least two natural objects, consistent with the laws of physics comprising at least conservation of mass, conservation of momentum, and conservation of energy of the at least two natural objects;
  extract the set of intrinsic parameters;
  receive a set of extrinsic parameters from a second input port, which are distinct from the set of intrinsic motion parameters, the set of extrinsic parameters describing at least a second motion of the at least two natural objects interacting in the physical scene, comprising both second independent motion and second contact between the at least two natural objects, the first independent motion being different from the second independent motion and the first contact being different from the second contact;
  determine at least one statistic for a random variable associated with an outcome of the second independent motion and the second contact, comprising a likelihood of damage to at least one of the at least two natural objects, as a result of movement according to at least the set of extrinsic parameters;
  render the spatial and temporal computer model, to define a spatial and temporal representation of the at least two natural objects within the physical scene according to at least the set of extrinsic parameters, portions of the set of intrinsic parameters consistent with the set of extrinsic parameters, and a performance statistic for a predefined activity represented in the defined spatial and temporal representation; and
  generate a rendered output of the animated computer model as at least one stream of output images defining at least two spatial dimensions and a temporal dimension; and
an output port configured to communicate the generated rendered output.

11. The system according to claim 10, wherein the at least one automated processor is further configured to generate the computer model based on both the at least one stream of input images and information received through the Internet from an external database of characteristics of the at least two natural objects.

12. The system according to claim 10, wherein:
the physical scene comprises a sports arena in which a competitive sports event occurs, having an interaction outcome;
the at least two natural objects comprise at least two human athletes competing within the sports arena;
the at least one stream of input images comprises televised video images of the at least two human athletes competing within the sports arena;
the second input port is configured to receive a human user input comprising the set of extrinsic parameters to cause the at least one automated processor to alter the interaction outcome of the at least two human athletes competing within the sports arena represented in the generated rendered output.

13. The system according to claim 10, wherein:
the at least two natural objects comprise a sports projectile and at least two human athletes competing according to a game having a set of rules involving the sports projectile;
wherein the at least one automated processor is further configured to analyze the at least one stream of input images to determine a compliance with the set of rules of the game.

14. A method, comprising:
receiving a first stream of input images representing a three dimensional physical scene over time, representing a movement and contact of at least two natural objects in the physical scene, at least one of the at least two natural objects comprising a sports competitor of a competitive game represented in the first stream of input images;
generating, with at least one automated processor, a spatial and temporal model of each of the at least two natural objects, the model reflecting laws of physics comprising at least conservation of mass, conservation of momentum, and conservation of energy;
extracting, with the at least one automated processor, a set of intrinsic parameters describing the movement and contact of the at least two natural objects in the physical scene, consistent with the generated spatial and temporal model of each of the at least two natural objects;
receiving a set of extrinsic parameters which differ from the set of intrinsic motion parameters;
applying, with the at least one automated processor, the set of extrinsic parameters and the at least one statistic for the random variable, to the generated spatial and temporal model of each of the at least two natural objects, to represent a modification of the movement and contact of the at least two natural objects in the physical scene;
rendering, with the at least one automated processor, the generated spatial and temporal model of each of the at least two natural objects, to define a modified representation of the three dimensional scene over time according to at least the modification of the movement and contact of the at least two natural objects in the physical scene;
outputting a second stream of output images comprising the rendered generated spatial and temporal model of each of the at least two natural objects defining the modified representation of the three dimensional scene over time; and
receiving at least one statistic for a random variable associated with an outcome of the modification of the movement and contact of the at least two natural objects in the physical scene, comprising a likelihood of injuries to the sports competitor represented in the second stream as a result of at least movement of the at least two natural objects in the physical scene according to the set of extrinsic parameters.

15. The method according to claim 14, wherein the at least one statistic for the random variable associated with the outcome of the movement and contact of the at least two natural objects in the physical scene comprises a likelihood of completion of a sports objective of a competitive game represented in the second stream.

16. The method according to claim 14, wherein the competitive game represented in the second stream is football.

17. The method according to claim 14, further comprising receiving an interactive advertisement from the Internet for presentation in the second stream.

18. The method according to claim 14, further comprising receiving the set of extrinsic parameters by acquiring images of a human user through an input device comprising a camera.

19. The method according to claim 14, further comprising receiving the set of extrinsic parameters by sensing movements of a human user through an input device comprising at least one of an accelerometer and a gyroscope.

\* \* \* \* \*